(12) United States Patent
Saylor et al.

(10) Patent No.: US 10,244,188 B2
(45) Date of Patent: Mar. 26, 2019

(54) BIOMETRIC IMAGING DEVICES AND ASSOCIATED METHODS

(71) Applicant: SiOnyx, LLC., Beverly, MA (US)

(72) Inventors: Stephen D. Saylor, Annisquam, MA (US); Martin U. Pralle, Wayland, MA (US)

(73) Assignee: SiOnyx, LLC, Beverly, MA (US)

( * ) Notice: Subject to any disclaimer, the term of this patent is extended or adjusted under 35 U.S.C. 154(b) by 0 days.

(21) Appl. No.: 14/864,592

(22) Filed: Sep. 24, 2015

(65) Prior Publication Data
US 2016/0119555 A1   Apr. 28, 2016

Related U.S. Application Data

(63) Continuation of application No. 13/549,107, filed on Jul. 13, 2012, now abandoned.
(Continued)

(51) Int. Cl.
*H04N 5/33* (2006.01)
*H04N 7/18* (2006.01)
*G06K 9/00* (2006.01)

(52) U.S. Cl.
CPC ........... *H04N 5/33* (2013.01); *G06K 9/00604* (2013.01); *H04N 7/183* (2013.01)

(58) Field of Classification Search
CPC .............................. G09K 9/00604; G01J 3/108
See application file for complete search history.

(56) References Cited

U.S. PATENT DOCUMENTS

| 3,487,223 A | 12/1969 | St. John |
|---|---|---|
| 3,922,571 A | 11/1975 | Smith |

(Continued)

FOREIGN PATENT DOCUMENTS

| AU | 3666484 | 6/1985 |
|---|---|---|
| CN | 1507075 | 6/2004 |

(Continued)

OTHER PUBLICATIONS

Huang et al., "Microstructured Silicon Photodetector", Jul. 2006, Applied Physics Letters, vol. 89, Iss. 3, pp. 1-3.*

(Continued)

*Primary Examiner* — David P Porta
*Assistant Examiner* — Jeremy S Valentiner
(74) *Attorney, Agent, or Firm* — Thomas J. Engellenner; Reza Mollaaghababa; Pepper Hamilton LLP

(57) ABSTRACT

Systems, devices, and methods for identifying an individual in both cooperative and non-cooperative situations are provided. In one aspect, for example, a system for identifying an individual can include an active light source capable of emitting electromagnetic radiation having at least one wavelength of from about 700 nm to about 1200 nm, and an imager device positioned to receive the electromagnetic radiation upon reflection from an individual to generate an electronic representation of the individual. The system can also include an image processing module functionally coupled to the imager device to receive the electronic representation. The image processing module processes the electronic representation into an individual representation having at least one substantially unique identification trait. The imager device can include a semiconductor device layer having a thickness of less than about 10 microns, at least two doped regions forming a junction, and a textured region positioned to interact with the electromagnetic radiation, and can have an external quantum efficiency of at least about 33% for at least one wavelength of greater than 800 nm.

24 Claims, 9 Drawing Sheets

Related U.S. Application Data

(60) Provisional application No. 61/507,488, filed on Jul. 13, 2011.

(56) References Cited

U.S. PATENT DOCUMENTS

| | | | |
|---|---|---|---|
| 3,973,994 A | 8/1976 | Redfield | |
| 3,994,012 A | 11/1976 | Warner, Jr. | |
| 4,017,887 A | 4/1977 | Davies et al. | |
| 4,105,955 A | 8/1978 | Hayashi | |
| 4,149,174 A | 4/1979 | Shannon | |
| 4,176,365 A | 11/1979 | Kroger | |
| 4,181,538 A | 1/1980 | Narayan et al. | |
| 4,201,450 A | 5/1980 | Trapani | |
| 4,242,149 A | 12/1980 | King et al. | |
| 4,253,882 A | 3/1981 | Dalal | |
| 4,277,793 A | 7/1981 | Webb | |
| 4,322,571 A | 3/1982 | Stanbery | |
| 4,343,832 A | 8/1982 | Smith | |
| 4,346,164 A | 8/1982 | Tabarelli et al. | |
| 4,419,533 A | 12/1983 | Czubatyj et al. | |
| 4,452,826 A | 6/1984 | Shields et al. | |
| 4,493,942 A | 1/1985 | Sheng et al. | |
| 4,514,582 A | 4/1985 | Tiedje et al. | |
| 4,536,608 A | 8/1985 | Sheng et al. | |
| 4,546,945 A | 10/1985 | Nessfield | |
| 4,568,960 A | 2/1986 | Petroff et al. | |
| 4,593,303 A | 6/1986 | Dyck et al. | |
| 4,593,313 A | 6/1986 | Nagasaki | |
| 4,617,593 A | 10/1986 | Dudley | |
| 4,630,082 A | 12/1986 | Sakai | |
| 4,648,936 A | 3/1987 | Ashby et al. | |
| 4,663,188 A | 5/1987 | Kane | |
| 4,672,206 A * | 6/1987 | Suzuki | G08B 13/193 250/342 |
| 4,673,770 A | 6/1987 | Mandelkorn | |
| 4,679,068 A | 7/1987 | Lillquist et al. | |
| 4,703,996 A | 11/1987 | Glass et al. | |
| 4,723,086 A | 2/1988 | Leibovich et al. | |
| 4,751,571 A | 6/1988 | Lillquist | |
| 4,773,944 A | 9/1988 | Nath et al. | |
| 4,775,425 A | 10/1988 | Guha et al. | |
| 4,777,490 A | 10/1988 | Sharma et al. | |
| 4,829,013 A | 5/1989 | Yamazaki | |
| 4,838,952 A | 6/1989 | Dill et al. | |
| 4,883,962 A | 11/1989 | Elliot | |
| 4,886,958 A | 12/1989 | Merryman | |
| 4,887,255 A | 12/1989 | Handa et al. | |
| 4,894,526 A | 1/1990 | Bethea et al. | |
| 4,910,568 A | 3/1990 | Taki et al. | |
| 4,910,588 A | 3/1990 | Kinoshita et al. | |
| 4,964,134 A | 10/1990 | Westbrook et al. | |
| 4,965,784 A | 10/1990 | Land et al. | |
| 4,968,372 A | 11/1990 | Maass | |
| 4,999,308 A | 3/1991 | Nishiura et al. | |
| 5,021,100 A | 6/1991 | Ishihara et al. | |
| 5,021,854 A | 6/1991 | Huth | |
| 5,080,725 A | 1/1992 | Green et al. | |
| 5,081,049 A | 1/1992 | Green et al. | |
| 5,089,437 A | 2/1992 | Shima et al. | |
| 5,100,478 A | 3/1992 | Kawabata | |
| 5,114,876 A | 5/1992 | Weiner | |
| 5,127,964 A | 7/1992 | Hamakawa et al. | |
| 5,164,324 A | 11/1992 | Russell et al. | |
| 5,182,231 A | 1/1993 | Hongo et al. | |
| 5,208,822 A | 5/1993 | Haus et al. | |
| 5,223,043 A | 6/1993 | Olson et al. | |
| 5,234,790 A | 8/1993 | Lang et al. | |
| 5,236,863 A | 8/1993 | Iranmanesh | |
| 5,244,817 A | 9/1993 | Hawkins et al. | |
| 5,296,045 A | 3/1994 | Banerjee et al. | |
| 5,309,275 A | 5/1994 | Nishimura et al. | |
| 5,322,988 A | 6/1994 | Russell et al. | |
| 5,346,850 A | 9/1994 | Kaschmitter et al. | |
| 5,351,446 A | 10/1994 | Langsdorf | |
| 5,370,747 A | 12/1994 | Noguchi et al. | |
| 5,373,182 A | 12/1994 | Norton | |
| 5,381,431 A | 1/1995 | Zayhowski | |
| 5,383,217 A | 1/1995 | Uemura | |
| 5,390,201 A | 2/1995 | Tomono et al. | |
| 5,410,168 A | 4/1995 | Hisa | |
| 5,413,100 A | 5/1995 | Barthelemy et al. | |
| 5,449,626 A | 9/1995 | Hezel | |
| 5,454,347 A | 10/1995 | Shibata et al. | |
| 5,502,329 A | 3/1996 | Pezzani | |
| 5,507,881 A | 4/1996 | Sichanugrist et al. | |
| 5,523,570 A | 6/1996 | Hairston | |
| 5,559,361 A | 9/1996 | Pezzani | |
| 5,569,615 A | 10/1996 | Yamazaki et al. | |
| 5,569,624 A | 10/1996 | Weiner | |
| 5,578,858 A | 11/1996 | Mueller et al. | |
| 5,580,615 A | 12/1996 | Itoh et al. | |
| 5,583,704 A | 12/1996 | Fujii | |
| 5,589,008 A | 12/1996 | Kepper | |
| 5,589,704 A | 12/1996 | Levine | |
| 5,597,621 A | 1/1997 | Hummel et al. | |
| 5,600,130 A | 2/1997 | VanZeghbroeck | |
| 5,627,081 A | 5/1997 | Tsuo et al. | |
| 5,635,089 A | 6/1997 | Singh et al. | |
| 5,640,013 A | 6/1997 | Ishikawa et al. | |
| 5,641,362 A | 6/1997 | Meier | |
| 5,641,969 A | 6/1997 | Cooke et al. | |
| 5,705,413 A | 1/1998 | Harkin et al. | |
| 5,705,828 A | 1/1998 | Noguchi et al. | |
| 5,708,486 A | 1/1998 | Miyawaki et al. | |
| 5,710,442 A | 1/1998 | Watanabe et al. | |
| 5,714,404 A | 2/1998 | Mititsky et al. | |
| 5,727,096 A | 3/1998 | Ghirardi et al. | |
| 5,731,213 A | 3/1998 | Ono | |
| 5,751,005 A | 5/1998 | Wyles et al. | |
| 5,758,644 A | 6/1998 | Diab et al. | |
| 5,766,127 A | 6/1998 | Pologe et al. | |
| 5,766,964 A | 6/1998 | Rohatgi et al. | |
| 5,773,820 A | 6/1998 | Osajda et al. | |
| 5,779,631 A | 7/1998 | Chance | |
| 5,781,392 A | 7/1998 | Clark | |
| 5,792,280 A | 8/1998 | Ruby et al. | |
| 5,802,091 A | 8/1998 | Chakrabarti et al. | |
| 5,808,350 A | 9/1998 | Jack et al. | |
| 5,859,446 A | 1/1999 | Nagasu et al. | |
| 5,861,639 A | 1/1999 | Bernier | |
| 5,871,826 A | 2/1999 | Mei | |
| 5,898,672 A | 4/1999 | Ginzboorg | |
| 5,918,140 A | 6/1999 | Wickboldt et al. | |
| 5,923,071 A | 7/1999 | Saito | |
| 5,935,320 A | 8/1999 | Graef et al. | |
| 5,942,789 A | 8/1999 | Morikawa | |
| 5,943,584 A | 8/1999 | Shim et al. | |
| 5,963,790 A | 10/1999 | Matsuno et al. | |
| 5,977,515 A | 11/1999 | Uraki et al. | |
| 5,977,603 A | 11/1999 | Ishikawa | |
| 5,995,606 A | 11/1999 | Civanlar et al. | |
| 6,019,796 A | 2/2000 | Mei | |
| 6,048,588 A | 4/2000 | Engelsberg | |
| 6,049,058 A | 4/2000 | Dulaney et al. | |
| 6,071,796 A | 6/2000 | Voutsas | |
| 6,072,117 A | 6/2000 | Matsuyama et al. | |
| 6,080,988 A | 6/2000 | Ishizuya et al. | |
| 6,082,858 A * | 7/2000 | Grace | A61B 3/113 257/440 |
| 6,097,031 A | 8/2000 | Cole | |
| 6,106,689 A | 8/2000 | Matsuyama | |
| 6,107,618 A | 8/2000 | Fossum et al. | |
| 6,111,300 A | 8/2000 | Cao et al. | |
| 6,117,499 A | 9/2000 | Wong et al. | |
| 6,121,130 A | 9/2000 | Chua et al. | |
| 6,128,379 A | 10/2000 | Smyk | |
| 6,131,511 A | 10/2000 | Wachi et al. | |
| 6,131,512 A | 10/2000 | Verlinden et al. | |
| 6,147,297 A | 11/2000 | Wettling et al. | |
| 6,160,833 A | 12/2000 | Floyd et al. | |
| 6,168,965 B1 | 1/2001 | Malinovich et al. | |
| 6,194,722 B1 | 2/2001 | Fiorini et al. | |
| 6,204,506 B1 | 3/2001 | Akahori et al. | |

(56) References Cited

U.S. PATENT DOCUMENTS

| | | |
|---|---|---|
| 6,229,192 B1 | 5/2001 | Gu |
| 6,242,291 B1 | 6/2001 | Kusumoto et al. |
| 6,252,256 B1 | 6/2001 | Ugge et al. |
| 6,272,768 B1 | 8/2001 | Danese |
| 6,290,713 B1 | 9/2001 | Russell |
| 6,291,302 B1 | 9/2001 | Yu |
| 6,313,901 B1 | 11/2001 | Cacharelis |
| 6,320,296 B1 | 11/2001 | Fujii et al. |
| 6,327,022 B1 | 12/2001 | Nishi |
| 6,331,445 B1 | 12/2001 | Janz et al. |
| 6,331,885 B1 | 12/2001 | Nishi |
| 6,333,485 B1 | 12/2001 | Haight et al. |
| 6,340,281 B1 | 1/2002 | Haraguchi |
| 6,372,536 B1 | 4/2002 | Fischer et al. |
| 6,372,591 B1 | 4/2002 | Mineji et al. |
| 6,372,611 B1 | 4/2002 | Horikawa |
| 6,379,979 B1 | 4/2002 | Connolly |
| 6,420,706 B1 | 7/2002 | Lurie et al. |
| 6,429,036 B1 | 8/2002 | Nixon et al. |
| 6,429,037 B1 | 8/2002 | Wenham et al. |
| 6,457,478 B1 | 10/2002 | Danese |
| 6,465,860 B2 | 10/2002 | Shigenaka et al. |
| 6,475,839 B2 | 11/2002 | Zhang et al. |
| 6,479,093 B2 | 11/2002 | Lauffer et al. |
| 6,483,116 B1 | 11/2002 | Kozlowski et al. |
| 6,483,929 B1 | 11/2002 | Marakami et al. |
| 6,486,046 B2 | 11/2002 | Fujimura et al. |
| 6,486,522 B1 | 11/2002 | Bishay et al. |
| 6,493,567 B1 | 12/2002 | Krivitski et al. |
| 6,498,336 B1 | 12/2002 | Tian et al. |
| 6,500,690 B1 | 12/2002 | Yamagishi et al. |
| 6,504,178 B2 | 1/2003 | Carlson et al. |
| 6,562,705 B1 | 5/2003 | Ohara |
| 6,580,053 B1 | 6/2003 | Voutsas |
| 6,583,936 B1 | 6/2003 | Kaminsky et al. |
| 6,586,318 B1 | 7/2003 | Lu |
| 6,597,025 B2 | 7/2003 | Lauter et al. |
| 6,607,927 B2 | 8/2003 | Ramappa et al. |
| 6,624,049 B1 | 9/2003 | Yamazaki |
| 6,639,253 B2 | 10/2003 | Duane et al. |
| 6,653,554 B2 | 11/2003 | Ishihara |
| 6,667,528 B2 | 12/2003 | Cohen et al. |
| 6,677,655 B2 | 1/2004 | Fitzergald |
| 6,677,656 B2 | 1/2004 | Francois |
| 6,683,326 B2 | 1/2004 | Iguchi et al. |
| 6,689,209 B2 | 2/2004 | Falster et al. |
| 6,690,968 B2 | 2/2004 | Mejia |
| 6,734,455 B2 | 5/2004 | Li |
| 6,753,585 B1 | 6/2004 | Kindt |
| 6,756,104 B2 | 6/2004 | Sokol et al. |
| 6,759,262 B2 | 7/2004 | Theil et al. |
| 6,790,701 B2 | 9/2004 | Shigenaka et al. |
| 6,796,144 B2 | 9/2004 | Shepard et al. |
| 6,800,541 B2 | 10/2004 | Okumura |
| 6,801,799 B2 | 10/2004 | Mendelson |
| 6,803,555 B1 | 10/2004 | Parrish et al. |
| 6,815,685 B2 | 11/2004 | Wany |
| 6,818,535 B2 | 11/2004 | Lu et al. |
| 6,822,313 B2 | 11/2004 | Matsushita |
| 6,825,057 B1 | 11/2004 | Heyers et al. |
| 6,864,156 B1 | 3/2005 | Conn |
| 6,864,190 B2 | 3/2005 | Han et al. |
| 6,867,806 B1 | 3/2005 | Lee et al. |
| 6,876,003 B1 | 4/2005 | Nakamura et al. |
| 6,897,118 B1 | 5/2005 | Poon et al. |
| 6,900,839 B1 | 5/2005 | Kozlowski et al. |
| 6,907,135 B2 | 6/2005 | Gifford |
| 6,911,375 B2 | 6/2005 | Guarini et al. |
| 6,919,587 B2 | 7/2005 | Ballon et al. |
| 6,923,625 B2 | 8/2005 | Sparks |
| 6,927,432 B2 | 8/2005 | Holm et al. |
| 6,984,816 B2 | 1/2006 | Holm et al. |
| 7,008,854 B2 | 3/2006 | Forbes |
| 7,041,525 B2 | 5/2006 | Clevenger et al. |
| 7,057,256 B2 | 6/2006 | Carey, III et al. |
| 7,075,079 B2 | 7/2006 | Wood |
| 7,091,411 B2 | 8/2006 | Falk et al. |
| 7,109,517 B2 | 9/2006 | Zaidi |
| 7,112,545 B1 | 9/2006 | Railkar et al. |
| 7,126,212 B2 | 10/2006 | Enquist et al. |
| 7,132,724 B1 | 11/2006 | Merrill |
| 7,202,102 B2 | 4/2007 | Yao |
| 7,211,214 B2 | 5/2007 | Chou |
| 7,211,501 B2 | 5/2007 | Liu et al. |
| 7,235,812 B2 | 6/2007 | Chu et al. |
| 7,247,527 B2 | 7/2007 | Shimomura et al. |
| 7,247,812 B2 | 7/2007 | Tsao |
| 7,256,102 B2 | 8/2007 | Nakata et al. |
| 7,271,445 B2 | 9/2007 | Forbes |
| 7,271,835 B2 | 9/2007 | Iizuka et al. |
| 7,285,482 B2 | 10/2007 | Ochi |
| 7,314,832 B2 | 1/2008 | Kountz et al. |
| 7,315,014 B2 | 1/2008 | Lee et al. |
| 7,354,792 B2 | 4/2008 | Carey, III et al. |
| 7,358,498 B2 | 4/2008 | Geng et al. |
| 7,375,378 B2 | 5/2008 | Manivannan et al. |
| 7,390,689 B2 | 6/2008 | Mazur et al. |
| 7,413,909 B2 | 8/2008 | Hutchens et al. |
| 7,425,471 B2 | 9/2008 | Bruland et al. |
| 7,432,148 B2 | 10/2008 | Li et al. |
| 7,442,629 B2 | 10/2008 | Mazur et al. |
| 7,446,359 B2 | 11/2008 | Lee et al. |
| 7,446,807 B2 | 11/2008 | Hong |
| 7,456,452 B2 | 11/2008 | Wells et al. |
| 7,482,532 B2 | 1/2009 | Yi et al. |
| 7,498,650 B2 | 3/2009 | Lauxtermann |
| 7,504,325 B2 | 3/2009 | Koezuka et al. |
| 7,504,702 B2 | 3/2009 | Mazur et al. |
| 7,511,750 B2 | 3/2009 | Murakami |
| 7,521,737 B2 | 4/2009 | Augusto |
| 7,528,463 B2 | 5/2009 | Forbes |
| 7,542,085 B2 | 6/2009 | Altice, Jr. et al. |
| 7,547,616 B2 | 6/2009 | Fogel et al. |
| 7,551,059 B2 | 6/2009 | Farrier |
| 7,560,750 B2 | 7/2009 | Niira et al. |
| 7,564,631 B2 | 7/2009 | Li et al. |
| 7,569,503 B2 | 8/2009 | Pan |
| 7,582,515 B2 | 9/2009 | Choi et al. |
| 7,586,601 B2 | 9/2009 | Eb stein |
| 7,592,593 B2 | 9/2009 | Kauffman et al. |
| 7,595,213 B2 | 9/2009 | Kwon et al. |
| 7,605,064 B2 | 10/2009 | Kizilyalli et al. |
| 7,605,397 B2 | 10/2009 | Kindem et al. |
| 7,615,808 B2 | 11/2009 | Pain et al. |
| 7,618,839 B2 | 11/2009 | Rhodes |
| 7,619,269 B2 | 11/2009 | Ohkawa |
| 7,629,234 B2 | 12/2009 | Bruland |
| 7,629,582 B2 | 12/2009 | Hoffman et al. |
| 7,648,851 B2 | 1/2010 | Fu et al. |
| 7,649,156 B2 | 1/2010 | Lee |
| 7,687,740 B2 | 3/2010 | Bruland et al. |
| 7,705,879 B2 | 4/2010 | Kerr et al. |
| 7,728,274 B2 | 6/2010 | Pilla et al. |
| 7,731,665 B2 | 6/2010 | Lee et al. |
| 7,741,666 B2 | 6/2010 | Nozaki et al. |
| 7,745,901 B1 | 6/2010 | McCaffrey et al. |
| 7,763,913 B2 | 7/2010 | Fan et al. |
| 7,772,028 B2 | 8/2010 | Adkisson et al. |
| 7,781,856 B2 | 8/2010 | Mazur et al. |
| 7,800,192 B2 | 9/2010 | Venezia et al. |
| 7,800,684 B2 | 9/2010 | Tatani |
| 7,816,220 B2 | 10/2010 | Mazur et al. |
| 7,828,983 B2 | 11/2010 | Weber et al. |
| 7,847,253 B2 | 12/2010 | Carey et al. |
| 7,847,326 B2 | 12/2010 | Park et al. |
| 7,855,406 B2 | 12/2010 | Yamaguchi et al. |
| 7,875,498 B2 | 1/2011 | Elbanhawy et al. |
| 7,880,168 B2 | 2/2011 | Lenchenkov |
| 7,884,439 B2 | 2/2011 | Mazur et al. |
| 7,884,446 B2 | 2/2011 | Mazur et al. |
| 7,897,942 B1 | 3/2011 | Bereket |
| 7,910,964 B2 | 3/2011 | Kawahito et al. |
| 7,923,801 B2 | 4/2011 | Tian et al. |
| 7,935,941 B2 | 5/2011 | Bruland et al. |

(56) References Cited

U.S. PATENT DOCUMENTS

| | | |
|---|---|---|
| 7,968,834 B2 | 6/2011 | Veeder |
| 8,008,205 B2 | 8/2011 | Fukushima et al. |
| 8,013,411 B2 | 9/2011 | Cole |
| 8,030,726 B2 | 10/2011 | Sumi |
| 8,035,343 B2 | 10/2011 | Seman, Jr. |
| 8,058,615 B2 | 11/2011 | McCaffrey |
| 8,076,746 B2 | 12/2011 | McCarten et al. |
| 8,080,467 B2 | 12/2011 | Carey et al. |
| 8,088,219 B2 | 1/2012 | Knerer et al. |
| 8,093,559 B1 | 1/2012 | Rajavel |
| RE43,169 E | 2/2012 | Parker |
| 8,164,126 B2 | 4/2012 | Moon et al. |
| 8,207,051 B2 | 6/2012 | Sickler et al. |
| 8,247,259 B2 | 8/2012 | Grolier et al. |
| 8,259,293 B2 | 9/2012 | Andreou et al. |
| 8,268,403 B2 | 9/2012 | Akiyama et al. |
| 8,288,702 B2 | 10/2012 | Veeder |
| 8,355,545 B2 | 1/2013 | Corcoran et al. |
| 8,445,950 B2 | 5/2013 | Iida et al. |
| 8,445,985 B2 | 5/2013 | Hiyama et al. |
| 8,456,546 B2 | 6/2013 | Oike |
| 8,470,619 B2 | 6/2013 | Bour |
| 8,476,681 B2 | 7/2013 | Haddad et al. |
| 8,530,264 B2 | 9/2013 | De Munck et al. |
| 8,564,087 B2 | 10/2013 | Yamamura et al. |
| 8,603,902 B2 | 12/2013 | Mazer et al. |
| 8,604,405 B2 | 12/2013 | Liu et al. |
| 8,629,485 B2 | 1/2014 | Yamamura et al. |
| 8,649,568 B2 | 2/2014 | Sato |
| 8,680,591 B2 | 3/2014 | Haddad et al. |
| 8,698,272 B2 | 4/2014 | Vineis |
| 8,729,678 B2 | 5/2014 | Shim et al. |
| 8,742,528 B2 | 6/2014 | Yamamura et al. |
| 8,884,226 B2 | 11/2014 | Miyazaki et al. |
| 8,906,670 B2 | 12/2014 | Gray |
| 8,916,945 B2 | 12/2014 | Sakamoto et al. |
| 8,928,784 B2 | 1/2015 | Watanabe et al. |
| 8,994,135 B2 | 3/2015 | Yamamura et al. |
| 9,064,762 B2 | 6/2015 | Yamaguchi |
| 9,184,204 B2 | 11/2015 | Hu |
| 9,190,551 B2 | 11/2015 | Yamamura et al. |
| 9,276,143 B2 | 3/2016 | Mazur |
| 9,369,641 B2 | 6/2016 | Hu |
| 9,419,159 B2 | 8/2016 | Sakamoto et al. |
| 9,478,572 B2 | 10/2016 | Miyanami |
| 9,559,215 B1 | 1/2017 | Ahmed |
| 9,659,984 B2 | 5/2017 | Ohkubo et al. |
| 9,673,250 B2 | 6/2017 | Haddad |
| 2001/0017344 A1 | 8/2001 | Aebi |
| 2001/0022768 A1 | 9/2001 | Takahashi |
| 2001/0044175 A1 | 11/2001 | Barret et al. |
| 2001/0044251 A1 | 11/2001 | Cho et al. |
| 2001/0044266 A1 | 11/2001 | Katsuoka |
| 2002/0020893 A1 | 2/2002 | Lhorte |
| 2002/0024618 A1 | 2/2002 | Imai |
| 2002/0034845 A1 | 3/2002 | Fujimura et al. |
| 2002/0056845 A1 | 5/2002 | Iguchi et al. |
| 2002/0060322 A1 | 5/2002 | Tanabe et al. |
| 2002/0079290 A1 | 6/2002 | Holdermann |
| 2002/0117699 A1 | 8/2002 | Roy |
| 2002/0126333 A1 | 9/2002 | Hosono et al. |
| 2002/0148964 A1 | 10/2002 | Dausch et al. |
| 2002/0176650 A1 | 11/2002 | Zhao et al. |
| 2002/0182769 A1 | 12/2002 | Campbell |
| 2003/0016708 A1 | 1/2003 | Albrecht et al. |
| 2003/0024269 A1 | 2/2003 | Shepard et al. |
| 2003/0025156 A1 | 2/2003 | Yamazaki et al. |
| 2003/0029495 A1 | 2/2003 | Mazur et al. |
| 2003/0030083 A1 | 2/2003 | Lee et al. |
| 2003/0045074 A1 | 3/2003 | Seibel et al. |
| 2003/0045092 A1 | 3/2003 | Shin |
| 2003/0057357 A1 | 3/2003 | Uppal et al. |
| 2003/0111106 A1 | 6/2003 | Nagano et al. |
| 2003/0132449 A1 | 7/2003 | Hosono et al. |
| 2003/0183270 A1 | 10/2003 | Falk et al. |
| 2003/0210332 A1 | 11/2003 | Frame |
| 2003/0213515 A1 | 11/2003 | Sano et al. |
| 2003/0214595 A1 | 11/2003 | Mabuchi |
| 2003/0228883 A1 | 12/2003 | Kusakari et al. |
| 2004/0014307 A1 | 1/2004 | Shin et al. |
| 2004/0016886 A1 | 1/2004 | Ringermacher et al. |
| 2004/0041168 A1 | 3/2004 | Hembree et al. |
| 2004/0046224 A1 | 3/2004 | Rossel et al. |
| 2004/0077117 A1 | 4/2004 | Ding et al. |
| 2004/0080638 A1 | 4/2004 | Lee |
| 2004/0112426 A1 | 6/2004 | Hagino |
| 2004/0130020 A1 | 7/2004 | Kuwabara et al. |
| 2004/0161868 A1 | 8/2004 | Hong |
| 2004/0169834 A1 | 9/2004 | Richter et al. |
| 2004/0222187 A1 | 11/2004 | Lin |
| 2004/0252931 A1 | 12/2004 | Belleville et al. |
| 2004/0256561 A1 | 12/2004 | Beuhler et al. |
| 2005/0032249 A1 | 2/2005 | Im et al. |
| 2005/0040440 A1 | 2/2005 | Murakami |
| 2005/0051822 A1 | 3/2005 | Manning |
| 2005/0062041 A1 | 3/2005 | Terakawa et al. |
| 2005/0063566 A1* | 3/2005 | Beek .................. A61B 5/0059 382/115 |
| 2005/0088634 A1 | 4/2005 | Kosugi |
| 2005/0093100 A1 | 5/2005 | Tze-Chiang et al. |
| 2005/0101100 A1 | 5/2005 | Kretchmer et al. |
| 2005/0101160 A1 | 5/2005 | Garg et al. |
| 2005/0127401 A1* | 6/2005 | Mazur ................ H01L 31/0236 257/200 |
| 2005/0134698 A1 | 6/2005 | Schroeder et al. |
| 2005/0150542 A1 | 7/2005 | Madan |
| 2005/0158969 A1 | 7/2005 | Binnis et al. |
| 2005/0184291 A1 | 8/2005 | Cole et al. |
| 2005/0184353 A1 | 8/2005 | Mouli |
| 2005/0211996 A1 | 9/2005 | Krishna et al. |
| 2005/0226287 A1 | 10/2005 | Shah et al. |
| 2005/0227390 A1 | 10/2005 | Shtein et al. |
| 2005/0227457 A1 | 10/2005 | Kondo et al. |
| 2006/0006482 A1 | 1/2006 | Rieve et al. |
| 2006/0011954 A1 | 1/2006 | Ueda et al. |
| 2006/0011955 A1 | 1/2006 | Baggenstoss |
| 2006/0060848 A1 | 3/2006 | Chang et al. |
| 2006/0071254 A1 | 4/2006 | Rhodes |
| 2006/0079062 A1 | 4/2006 | Mazur et al. |
| 2006/0086956 A1 | 4/2006 | Furukawa et al. |
| 2006/0097172 A1* | 5/2006 | Park .......................... G01J 3/36 250/338.1 |
| 2006/0102901 A1 | 5/2006 | Im et al. |
| 2006/0118781 A1 | 6/2006 | Rhodes |
| 2006/0121680 A1 | 6/2006 | Tanaka |
| 2006/0128087 A1* | 6/2006 | Bamji .................... G01S 7/4816 438/199 |
| 2006/0132633 A1 | 6/2006 | Nam et al. |
| 2006/0138396 A1 | 6/2006 | Lin et al. |
| 2006/0145148 A1 | 7/2006 | Hirai et al. |
| 2006/0145176 A1 | 7/2006 | Lee |
| 2006/0160343 A1 | 7/2006 | Chong et al. |
| 2006/0166475 A1 | 7/2006 | Mantl |
| 2006/0175529 A1 | 8/2006 | Harmon et al. |
| 2006/0180885 A1 | 8/2006 | Rhodes |
| 2006/0181627 A1 | 8/2006 | Farrier |
| 2006/0210122 A1* | 9/2006 | Cleveland ............... A61B 3/107 382/117 |
| 2006/0214121 A1 | 9/2006 | Schrey et al. |
| 2006/0228897 A1 | 10/2006 | Timans |
| 2006/0231853 A1 | 10/2006 | Tanaka |
| 2006/0231914 A1 | 10/2006 | Carey et al. |
| 2006/0238632 A1 | 10/2006 | Shah |
| 2006/0244090 A1 | 11/2006 | Roy et al. |
| 2006/0255340 A1 | 11/2006 | Manivannan et al. |
| 2006/0257140 A1 | 11/2006 | Seger |
| 2007/0035849 A1 | 2/2007 | Li et al. |
| 2007/0035879 A1 | 2/2007 | Hall et al. |
| 2007/0051876 A1 | 3/2007 | Sumi et al. |
| 2007/0052050 A1 | 3/2007 | Dierickx |
| 2007/0063219 A1 | 3/2007 | Sa'ar et al. |
| 2007/0076481 A1 | 4/2007 | Tennant |
| 2007/0102709 A1 | 5/2007 | Burgener et al. |
| 2007/0103580 A1 | 5/2007 | Noto |

(56) References Cited

U.S. PATENT DOCUMENTS

| | | | |
|---|---|---|---|
| 2007/0115554 A1 | 5/2007 | Breitung et al. | |
| 2007/0123005 A1 | 5/2007 | Hiura et al. | |
| 2007/0125951 A1 | 6/2007 | Snider et al. | |
| 2007/0131275 A1 | 6/2007 | Kinsey et al. | |
| 2007/0138590 A1 | 6/2007 | Wells et al. | |
| 2007/0145505 A1 | 6/2007 | Kim et al. | |
| 2007/0178672 A1 | 8/2007 | Tanaka et al. | |
| 2007/0187670 A1 | 8/2007 | Hsu et al. | |
| 2007/0189583 A1* | 8/2007 | Shimada | G06K 9/00255 382/118 |
| 2007/0194356 A1 | 8/2007 | Moon et al. | |
| 2007/0194401 A1 | 8/2007 | Nagai et al. | |
| 2007/0195056 A1 | 8/2007 | Lloyd | |
| 2007/0200940 A1 | 8/2007 | Gruhlke et al. | |
| 2007/0201859 A1 | 8/2007 | Sarrat | |
| 2007/0235827 A1 | 10/2007 | Altice | |
| 2007/0237504 A1 | 10/2007 | Nakashiba | |
| 2007/0243701 A1 | 10/2007 | Ito et al. | |
| 2007/0247414 A1 | 10/2007 | Roberts | |
| 2007/0262366 A1 | 11/2007 | Baek et al. | |
| 2007/0290283 A1 | 12/2007 | Park et al. | |
| 2007/0293056 A1 | 12/2007 | Setsuhara et al. | |
| 2007/0296060 A1 | 12/2007 | Tanabe et al. | |
| 2007/0298533 A1 | 12/2007 | Yang et al. | |
| 2008/0002863 A1* | 1/2008 | Northcott | A61B 3/1216 382/117 |
| 2008/0020555 A1 | 1/2008 | Shimomura et al. | |
| 2008/0026550 A1 | 1/2008 | Werner et al. | |
| 2008/0036022 A1 | 2/2008 | Hwang et al. | |
| 2008/0044943 A1* | 2/2008 | Mazur | H01L 21/268 438/95 |
| 2008/0076240 A1 | 3/2008 | Veschetti et al. | |
| 2008/0099804 A1 | 5/2008 | Venezia | |
| 2008/0121280 A1 | 5/2008 | Carnel et al. | |
| 2008/0121805 A1 | 5/2008 | Tweet et al. | |
| 2008/0135099 A1 | 6/2008 | Yu | |
| 2008/0142686 A1 | 6/2008 | Konno et al. | |
| 2008/0170173 A1 | 7/2008 | Park et al. | |
| 2008/0173620 A1 | 7/2008 | Grek | |
| 2008/0174685 A1 | 7/2008 | Shan et al. | |
| 2008/0178932 A1 | 7/2008 | Den Boer et al. | |
| 2008/0179762 A1 | 7/2008 | Cho et al. | |
| 2008/0191296 A1 | 8/2008 | Wang et al. | |
| 2008/0191310 A1 | 8/2008 | Wu et al. | |
| 2008/0192132 A1 | 8/2008 | Bechtel et al. | |
| 2008/0196761 A1 | 8/2008 | Nakano et al. | |
| 2008/0198251 A1 | 8/2008 | Xu et al. | |
| 2008/0202576 A1 | 8/2008 | Hieslmair | |
| 2008/0213936 A1 | 9/2008 | Hatai | |
| 2008/0223436 A1 | 9/2008 | den Boer et al. | |
| 2008/0242005 A1 | 10/2008 | Dozen et al. | |
| 2008/0251812 A1 | 10/2008 | Yoo | |
| 2008/0257409 A1 | 10/2008 | Li et al. | |
| 2008/0258604 A1 | 10/2008 | Mazur et al. | |
| 2008/0266434 A1 | 10/2008 | Sugawa et al. | |
| 2008/0266435 A1 | 10/2008 | Agranov et al. | |
| 2008/0281174 A1 | 11/2008 | Dietiker | |
| 2008/0303932 A1 | 12/2008 | Wang et al. | |
| 2008/0309913 A1 | 12/2008 | Fallon | |
| 2009/0002528 A1 | 1/2009 | Manabe et al. | |
| 2009/0009596 A1 | 1/2009 | Kerr et al. | |
| 2009/0014056 A1 | 1/2009 | Hockaday | |
| 2009/0027640 A1 | 1/2009 | Shibazaki | |
| 2009/0036783 A1 | 2/2009 | Kishima | |
| 2009/0038669 A1 | 2/2009 | Atanackovic | |
| 2009/0039397 A1 | 2/2009 | Chao | |
| 2009/0050944 A1 | 2/2009 | Hong | |
| 2009/0056797 A1 | 3/2009 | Barnett et al. | |
| 2009/0057536 A1 | 3/2009 | Hirose | |
| 2009/0065051 A1 | 3/2009 | Chan et al. | |
| 2009/0078316 A1 | 3/2009 | Khazeni et al. | |
| 2009/0090988 A1 | 4/2009 | Ohgishi | |
| 2009/0095887 A1 | 4/2009 | Saveliev | |
| 2009/0096049 A1 | 4/2009 | Oshiyama et al. | |
| 2009/0097290 A1 | 4/2009 | Chandrasekaran | |
| 2009/0101197 A1 | 4/2009 | Morikawa | |
| 2009/0109305 A1 | 4/2009 | Dai et al. | |
| 2009/0114630 A1 | 5/2009 | Hawryluk | |
| 2009/0142879 A1 | 6/2009 | Isaka et al. | |
| 2009/0146240 A1 | 6/2009 | Carey, III et al. | |
| 2009/0151785 A1 | 6/2009 | Naum et al. | |
| 2009/0160983 A1 | 6/2009 | Lenchenkov | |
| 2009/0174026 A1 | 7/2009 | Carey et al. | |
| 2009/0179199 A1 | 7/2009 | Sano et al. | |
| 2009/0180010 A1 | 7/2009 | Adikisson et al. | |
| 2009/0194671 A1 | 8/2009 | Nozaki et al. | |
| 2009/0200454 A1 | 8/2009 | Barbier et al. | |
| 2009/0200586 A1 | 8/2009 | Mao et al. | |
| 2009/0200625 A1 | 8/2009 | Venezia et al. | |
| 2009/0200626 A1 | 8/2009 | Qian et al. | |
| 2009/0200631 A1 | 8/2009 | Tai et al. | |
| 2009/0206237 A1 | 8/2009 | Shannon et al. | |
| 2009/0211627 A1 | 8/2009 | Meier et al. | |
| 2009/0213883 A1 | 8/2009 | Mazur et al. | |
| 2009/0218493 A1 | 9/2009 | McCaffrey et al. | |
| 2009/0223561 A1 | 9/2009 | Kim et al. | |
| 2009/0227061 A1 | 9/2009 | Bateman et al. | |
| 2009/0242019 A1 | 10/2009 | Ramamoorthy et al. | |
| 2009/0242032 A1 | 10/2009 | Yamazaki et al. | |
| 2009/0242933 A1 | 10/2009 | Hu et al. | |
| 2009/0256156 A1 | 10/2009 | Hsieh | |
| 2009/0256226 A1 | 10/2009 | Tatani | |
| 2009/0261255 A1 | 10/2009 | Nakamura et al. | |
| 2009/0273695 A1 | 11/2009 | Mabuchi | |
| 2009/0278967 A1 | 11/2009 | Toumiya | |
| 2009/0283807 A1 | 11/2009 | Adkisson et al. | |
| 2009/0294787 A1 | 12/2009 | Nakaji et al. | |
| 2009/0308450 A1 | 12/2009 | Adibi et al. | |
| 2009/0308457 A1 | 12/2009 | Smith et al. | |
| 2010/0000597 A1 | 1/2010 | Cousins | |
| 2010/0013036 A1 | 1/2010 | Carey | |
| 2010/0013039 A1 | 1/2010 | Qian et al. | |
| 2010/0013593 A1 | 1/2010 | Luckhardt | |
| 2010/0024871 A1 | 2/2010 | Oh et al. | |
| 2010/0032008 A1 | 2/2010 | Adekore | |
| 2010/0037952 A1 | 2/2010 | Lin | |
| 2010/0038523 A1 | 2/2010 | Venezia et al. | |
| 2010/0038542 A1 | 2/2010 | Carey et al. | |
| 2010/0040981 A1 | 2/2010 | Kiesel et al. | |
| 2010/0044552 A1 | 2/2010 | Chen | |
| 2010/0051809 A1 | 3/2010 | Onat et al. | |
| 2010/0052088 A1 | 3/2010 | Carey | |
| 2010/0053382 A1 | 3/2010 | Kuniba | |
| 2010/0055887 A1 | 3/2010 | Piwczyk | |
| 2010/0059385 A1 | 3/2010 | Li | |
| 2010/0059803 A1 | 3/2010 | Gidon et al. | |
| 2010/0072349 A1 | 3/2010 | Veeder | |
| 2010/0074396 A1 | 3/2010 | Schmand et al. | |
| 2010/0083997 A1 | 4/2010 | Hovel | |
| 2010/0084009 A1 | 4/2010 | Carlson et al. | |
| 2010/0096718 A1 | 4/2010 | Hynecek et al. | |
| 2010/0097609 A1 | 4/2010 | Jaeger et al. | |
| 2010/0102206 A1 | 4/2010 | Cazaux et al. | |
| 2010/0102366 A1 | 4/2010 | Lee et al. | |
| 2010/0108864 A1 | 5/2010 | Ohta et al. | |
| 2010/0109060 A1 | 5/2010 | Mao et al. | |
| 2010/0116312 A1 | 5/2010 | Peumans et al. | |
| 2010/0117181 A1 | 5/2010 | Kim et al. | |
| 2010/0118172 A1 | 5/2010 | McCarten et al. | |
| 2010/0128161 A1 | 5/2010 | Yamaguchi | |
| 2010/0128937 A1 | 5/2010 | Yoo et al. | |
| 2010/0133635 A1 | 6/2010 | Lee et al. | |
| 2010/0140733 A1 | 6/2010 | Lee et al. | |
| 2010/0140768 A1 | 6/2010 | Zafiropoulo | |
| 2010/0143744 A1 | 6/2010 | Gupta | |
| 2010/0147383 A1 | 6/2010 | Carey et al. | |
| 2010/0171948 A1 | 7/2010 | Mazur et al. | |
| 2010/0190292 A1 | 7/2010 | Alberts | |
| 2010/0200658 A1* | 8/2010 | Olmstead | G06K 7/10722 235/455 |
| 2010/0201834 A1 | 8/2010 | Maruyama et al. | |
| 2010/0213582 A9 | 8/2010 | Couillard et al. | |
| 2010/0219506 A1 | 9/2010 | Gupta | |
| 2010/0224229 A1 | 9/2010 | Pralle et al. | |

(56) References Cited

U.S. PATENT DOCUMENTS

| | | |
|---|---|---|
| 2010/0240169 A1 | 9/2010 | Petti et al. |
| 2010/0245647 A1 | 9/2010 | Honda et al. |
| 2010/0258176 A1 | 10/2010 | Kang et al. |
| 2010/0264473 A1 | 10/2010 | Adkisson et al. |
| 2010/0289885 A1 | 11/2010 | Lu et al. |
| 2010/0290668 A1* | 11/2010 | Friedman ........... G06K 9/00604 382/103 |
| 2010/0300505 A1 | 12/2010 | Chen |
| 2010/0300507 A1 | 12/2010 | Heng et al. |
| 2010/0313932 A1 | 12/2010 | Kroll et al. |
| 2011/0003424 A1 | 1/2011 | De Ceuster et al. |
| 2011/0019050 A1 | 1/2011 | Yamashita |
| 2011/0025842 A1 | 2/2011 | King et al. |
| 2011/0056544 A1 | 3/2011 | Ji et al. |
| 2011/0073976 A1 | 3/2011 | Vaillant |
| 2011/0095387 A1 | 4/2011 | Carey et al. |
| 2011/0104850 A1 | 5/2011 | Weidman et al. |
| 2011/0127567 A1 | 6/2011 | Seong |
| 2011/0140221 A1 | 6/2011 | Venezia et al. |
| 2011/0150304 A1 | 6/2011 | Abe et al. |
| 2011/0194100 A1* | 8/2011 | Thiel ..................... G01J 1/42 356/51 |
| 2011/0220971 A1 | 9/2011 | Haddad |
| 2011/0227138 A1* | 9/2011 | Haddad ............. H01L 27/14609 257/291 |
| 2011/0241148 A1 | 10/2011 | Hiyama et al. |
| 2011/0241152 A1 | 10/2011 | Hsiao et al. |
| 2011/0251478 A1 | 10/2011 | Wieczorek |
| 2011/0260059 A1 | 10/2011 | Jiang et al. |
| 2011/0266644 A1 | 11/2011 | Yamamura et al. |
| 2011/0292380 A1* | 12/2011 | Bamji ................. G01S 7/4863 356/141.1 |
| 2011/0303999 A1 | 12/2011 | Sakamoto et al. |
| 2012/0001841 A1 | 1/2012 | Gokingco et al. |
| 2012/0024363 A1 | 2/2012 | Carey et al. |
| 2012/0024364 A1 | 2/2012 | Carey, III et al. |
| 2012/0025199 A1 | 2/2012 | Chen et al. |
| 2012/0038811 A1 | 2/2012 | Ellis-monaghan et al. |
| 2012/0043637 A1 | 2/2012 | King et al. |
| 2012/0049242 A1 | 3/2012 | Atanackovic et al. |
| 2012/0049306 A1 | 3/2012 | Ohba et al. |
| 2012/0080733 A1 | 4/2012 | Doan et al. |
| 2012/0111396 A1 | 5/2012 | Saylor et al. |
| 2012/0147241 A1 | 6/2012 | Yamaguchi |
| 2012/0153127 A1 | 6/2012 | Hirigoyen et al. |
| 2012/0153128 A1 | 6/2012 | Roy et al. |
| 2012/0171804 A1 | 7/2012 | Moslehi et al. |
| 2012/0187190 A1 | 7/2012 | Wang et al. |
| 2012/0188431 A1 | 7/2012 | Takimoto |
| 2012/0217602 A1 | 8/2012 | Enomoto |
| 2012/0222396 A1 | 9/2012 | Clemen |
| 2012/0228473 A1 | 9/2012 | Yoshitsugu |
| 2012/0274744 A1 | 11/2012 | Wan |
| 2012/0291859 A1 | 11/2012 | Vineis et al. |
| 2012/0300037 A1 | 11/2012 | Laudo |
| 2012/0305063 A1 | 12/2012 | Moslehi et al. |
| 2012/0312304 A1 | 12/2012 | Lynch et al. |
| 2012/0313204 A1 | 12/2012 | Haddad et al. |
| 2012/0313205 A1 | 12/2012 | Haddad et al. |
| 2012/0326008 A1 | 12/2012 | Mckee et al. |
| 2013/0001553 A1 | 1/2013 | Vineis et al. |
| 2013/0020468 A1 | 1/2013 | Mitsuhashi et al. |
| 2013/0026531 A1 | 1/2013 | Seo et al. |
| 2013/0082343 A1 | 4/2013 | Fudaba et al. |
| 2013/0135439 A1 | 5/2013 | Kakuko et al. |
| 2013/0168792 A1 | 7/2013 | Haddad et al. |
| 2013/0168803 A1 | 7/2013 | Haddad et al. |
| 2013/0200251 A1 | 8/2013 | Velichko |
| 2013/0207212 A1 | 8/2013 | Mao et al. |
| 2013/0207214 A1 | 8/2013 | Haddad et al. |
| 2013/0285130 A1 | 10/2013 | Ting |
| 2014/0054662 A1 | 2/2014 | Yanagita et al. |
| 2014/0198240 A1 | 7/2014 | Rhoads |
| 2014/0247378 A1 | 9/2014 | Sharma et al. |
| 2014/0352779 A1 | 12/2014 | Smirnov et al. |
| 2014/0374868 A1 | 12/2014 | Lee et al. |
| 2015/0076468 A1 | 3/2015 | Yamaguchi et al. |
| 2017/0141258 A1 | 5/2017 | McFarland |
| 2017/0244920 A1 | 8/2017 | Ohkubo et al. |

FOREIGN PATENT DOCUMENTS

| | | |
|---|---|---|
| CN | 1614789 | 5/2005 |
| CN | 101053065 A | 10/2007 |
| CN | 101241923 | 8/2008 |
| CN | 101404307 | 4/2009 |
| CN | 101423942 | 5/2009 |
| CN | 101465361 | 6/2009 |
| CN | 101478013 | 7/2009 |
| CN | 101634026 | 1/2010 |
| CN | 101634027 | 1/2010 |
| CN | 101818348 | 9/2010 |
| CN | 201725796 | 1/2011 |
| CN | 102270646 | 12/2011 |
| DE | 19838439 | 4/2000 |
| EP | 0473439 | 3/1992 |
| EP | 0566156 | 10/1993 |
| EP | 1347670 A1 | 9/2003 |
| EP | 1630871 | 1/2006 |
| EP | 1873840 | 1/2008 |
| EP | 2073270 | 5/2012 |
| EP | 2509107 | 10/2012 |
| FR | 2827707 | 1/2003 |
| GB | 2030766 | 4/1980 |
| JP | S5771188 | 5/1982 |
| JP | S57173966 | 10/1982 |
| JP | S63116421 | 5/1988 |
| JP | H02152226 | 6/1990 |
| JP | H02237026 | 9/1990 |
| JP | H03183037 | 8/1991 |
| JP | H04318970 | 11/1992 |
| JP | H06104414 | 4/1994 |
| JP | 1994244444 A | 9/1994 |
| JP | H06244444 | 9/1994 |
| JP | H06267868 | 9/1994 |
| JP | H06267868 A | 9/1994 |
| JP | H06275641 | 9/1994 |
| JP | H0774240 | 3/1995 |
| JP | H07235658 | 5/1995 |
| JP | H07183484 | 7/1995 |
| JP | 9148594 | 6/1997 |
| JP | H09298308 | 11/1997 |
| JP | 11077348 | 3/1999 |
| JP | 11097724 | 4/1999 |
| JP | 2000164914 | 6/2000 |
| JP | 2001007381 | 1/2001 |
| JP | 2001189478 | 7/2001 |
| JP | 2001339057 | 12/2001 |
| JP | 2002043594 | 2/2002 |
| JP | 2002134640 | 5/2002 |
| JP | 2002190386 | 7/2002 |
| JP | 2003058269 | 2/2003 |
| JP | 2003104121 | 4/2003 |
| JP | 2003163360 | 6/2003 |
| JP | 2003258285 | 9/2003 |
| JP | 2004047682 | 2/2004 |
| JP | 2004273886 | 9/2004 |
| JP | 2004273887 | 9/2004 |
| JP | 2006033493 | 2/2006 |
| JP | 2006147991 | 6/2006 |
| JP | 2006173381 | 6/2006 |
| JP | 2006210701 | 8/2006 |
| JP | 2006261372 | 9/2006 |
| JP | 2007122237 | 5/2007 |
| JP | 2007165909 | 6/2007 |
| JP | 2007180642 | 7/2007 |
| JP | 2007180643 | 7/2007 |
| JP | 2007258684 | 10/2007 |
| JP | 2007305675 | 11/2007 |
| JP | 2008099158 | 4/2008 |
| JP | 2008167004 | 7/2008 |
| JP | 2008187003 | 8/2008 |
| JP | 2008283219 | 11/2008 |
| JP | 2008294698 | 12/2008 |

(56) References Cited

FOREIGN PATENT DOCUMENTS

| | | |
|---|---|---|
| JP | 2009021479 | 1/2009 |
| JP | 2009152569 | 7/2009 |
| JP | 2009253683 | 10/2009 |
| JP | 2010278472 | 12/2010 |
| JP | 2011091128 | 5/2011 |
| JP | 2012054321 | 3/2012 |
| JP | 2012212349 | 11/2012 |
| KR | 20010061058 | 4/2001 |
| KR | 2005039273 | 4/2005 |
| KR | 20060020400 | 3/2006 |
| KR | 20080014301 | 2/2008 |
| KR | 100825808 | 4/2008 |
| KR | 20080097709 | 11/2008 |
| KR | 20100026463 | 3/2010 |
| KR | 20100118864 | 11/2010 |
| KR | 20110079323 | 7/2011 |
| KR | 20060052278 | 5/2016 |
| TW | 200627675 | 8/2006 |
| TW | 200818529 | 4/2008 |
| WO | WO 91/14284 | 9/1991 |
| WO | WO 0131842 | 3/2001 |
| WO | WO 0135601 | 5/2001 |
| WO | WO 2002041363 | 5/2002 |
| WO | WO 03/059390 | 7/2003 |
| WO | WO 2005029599 | 3/2005 |
| WO | WO 2006043690 | 4/2006 |
| WO | WO 2006054758 | 5/2006 |
| WO | WO 2006/086014 | 8/2006 |
| WO | 2008091242 | 7/2008 |
| WO | WO 2008091242 | 7/2008 |
| WO | WO 2008099524 | 8/2008 |
| WO | WO 2008145097 | 12/2008 |
| WO | 2009100023 | 8/2009 |
| WO | WO 2009100023 | 8/2009 |
| WO | 2009147085 | 12/2009 |
| WO | WO 2009147085 | 12/2009 |
| WO | WO 2009147085 A1 * 12/2009 ................ G01J 1/42 | |
| WO | WO 2010033127 | 3/2010 |
| WO | 2011003871 | 1/2011 |
| WO | WO 2011003871 | 1/2011 |
| WO | 2011035188 | 3/2011 |
| WO | 2011119618 | 3/2011 |
| WO | WO 2011035188 | 3/2011 |
| WO | WO 2011119618 | 3/2011 |
| WO | WO 2012027290 | 3/2012 |
| WO | WO 2012117931 | 9/2012 |
| WO | WO 2012174752 | 12/2012 |

OTHER PUBLICATIONS

A. Arndt, J.F. Allison, J.G. Haynos, and A. Meulenberg, Jr., "Optical Properties of the COMSAT Non-reflective Cell," 11th IEEE Photovoltaic Spec. Conf., p. 40, 1975.
Asom et al., Interstitial Defect Reactions in Silicon; Appl. Phys. Lett.; Jul. 27, 1987; pp. 256-258; vol. 51(4); American Institute of Physics.
Berger, Michael; Moth Eyes Inspire Self-Cleaning Antireflection Nanotechnology Coatings; 2008; 3 pages; Nanowerk LLC.
Berger, O., Inns, D. and Aberle, A.E. "Commercial White Paint as Back Surface Reflector for Thin-Film Solar Cells", Solar Energy Materials & Solar Cells, vol. 91, pp. 1215-1221,2007.
Bernhard, C.G., "Structural and Functional Adaptation in a Visual System" Endevor vol. 26, pp. 79-84, May 1967.
Betta et al.; Si-PIN X-Ray Detector Technology; Nuclear Instruments and Methods in Physics Research; 1997; pp. 344-348; vol. A, No. 395; Elsevier Science B.V.
Boden, S.A. et al.; Nanoimprinting for Antireflective Moth-Eye Surfaces; 4 pages; 2008.
Bogue: "From bolometers to beetles: the development of the thermal imaging sensors;" sensor Review; 2007; pp. 278-281; Emerald Group Publishing Limited (ISSN 0260-2288).
Borghesi et al.; "Oxygen Precipitation in Silicon," J. Appl. Phys., v. 77(9), pp. 4169-4244 (May 1, 1995).
Born, M. and E.Wolf, "Princip les of Optics, 7th Ed.", Cambridge University Press, 1999, pp. 246-255.
Brieger,S., O.Dubbers, S.Fricker, A.Manzke, C.Pfahler, A.Plettl, and P.Zlemann, "An Approach for the Fabrication of Hexagonally Ordered Arrays of Cylindrical Nanoholes in Crystalline and Amorphous Silicon Based on the Self-Organization of Polymer Micelles", Nanotechnology, vol. 17, pp. 4991-4994, 2006, doi:10.1088/0957-4884/17/19/036.
Buttgen, B.; "Demodulation Pixel Based on Static Drift Fields"; IEEE Transactions on Electron Devices, vol. 53, No. 11, Nov. 2006.
Carey et al., "Femtosecond-Laser-Assisted Microstructuring of Silicon Surfaces", Optics and Photonics News, 2003. 14, 32-36.
Carey, et al. "Femtosecond Laser-Assisted Microstructuring of Silicon for Novel Detector, Sensing and Display Technologies", LEOS 2003, 481-482, Tuscon, AR.
Carey, et al. "Femtosecond Laser-Assisted Microstructuring of Silicon for Novel Detector, Sensing and Display Technologies", LEOS; 2002, 97-98, Glasgos, Scotland, 2002.
Carey, et al., "Fabrication of Micrometer-Sized Conical Field Emitters Using Femtosecond Laser-Assisted Etching of Silicon," Proc. IVMC 2001, 75-76, UC Davis, Davis, CA.
Carey, et al., "Field Emission from Silicon. Microstructures Formed by Femtosecond Laser Assisted Etching," Proc. CLEO 2001 (Baltimore, MD 2001) 555-557.
Carey, et al., "High Sensitivity Silicon-Based VIS/NIR Photodetectors", Optical Society of America (2003) 1-2.
Carey, III; "Femtosecond-laser Microstructuring of Silicon for Novel Optoelectronic Devices"; Harvard University, Jul. 2004; (Thesis).
Chang, S.W., V.P.Chuang, S.T.Boles, and C.V.Thompson, "Metal-Catalyzed Etching of Vertically Aligned Polysilicon and Amorphous Silicon Nanowire Arrays by Etching Direction Confinement", Advanced Functional Materials, vol. 20, No. 24, pp. 4364-4370, 2010.
Chen, Q. et al.; Broadband moth-eye antireflection coatings fabricated by low-cost nanoimprinting; Applied Physics Letters 94; pp. 263118-1-263118-3; 2009; American Institute of Physics.
Chien et al, "Pulse Width Effect in Ultrafast Laser Processing of Materials," Applied Physics A, 2005, 1257-1263, 81, Springer Berlin, Heidelberg, Germany.
Chiang, Wen Jen et al., "Silicon Nanocrystal-Based Photosensor on Low-Temperature Polycrystalline-Silicone Panels", Applied Physics Letters, 2007, 51120-1-51120-3, Ltt. 91, American Inst. of Physics, Melville, NY.
Chichkiv, B.N. et al, "Femtosecond, picosecond and nanosecond laser ablation of solids" Appl. Phys. A 63, 109-115; 1996.
Cilingiroglu et al., "An evaluation of MOS Interface-Trap Charge Pump as and Ultralow Constant-Current Generator," IEEE Journal of Solid-State Circuit, 2003, vol. 38, No. 1, Jan. 2003, 71-83.
Clapham, P.B. et al, "Reduction of Lens Reflexion by the Moth Eye Principle" Nature, vol. 244. Aug. 1973, pp. 281-282.
Cmosis; "Global Shutter Image Sensors for Machine Vision Application"; Image Sensors Europe 2010, Mar. 23-25, 2010; .COPYRGT. copyright 2010.
Cotter, Jeffrey E.; Optical intensity of light in layers of silicon with rear diffuse reflectors; Journal of Applied Physics; Jul. 1, 1998; pp. 618-624; vol. 84, No. 1; American Institute of Physics.
Crouch et al., "Comparison of Structure and Properties of Femtosecond and Nanosecond Laser-Structured Silicon" Appl. Phys. Lett., 2004, 84,1850-1852.
Crouch et al., "Infrared Absorption by Sulfur-Doped Silicon Formed by Femtosecond Laser Irradiation", Appl. Phys. A, 2004, 79, 1635-1641.
Despeisse, et al.; "Thin Film Silicon Solar Cell on Highly Textured Substrates for High Conversion Efficiency"; 2004.
Detection of X-ray and Gamma-ray Photons Using Silicon Diodes; Dec. 2000; Detection Technology, Inc.; Micropolis, Finland.
Dewan, Rahul et al.; Light Trapping in Thin-Film Silicon Solar Cells with Submicron Surface Texture; Optics Express; vol. 17, No. 25; Dec. 7, 2009; Optical Society of America.
Deych et al.; Advances in Computed Tomography and Digital Mammography; Power Point; Nov. 18, 2008; Analogic Corp.; Peabody, MA.

(56) References Cited

OTHER PUBLICATIONS

Dobie, et al.; "Minimization of reflected light in photovoltaic modules"; Mar. 1, 2009.
Dobrzanski, L.A. et al.; Laser Surface Treatment of Multicrystalline Silicon for Enhancing Optical Properties; Journal of Materials Processing Technology; p. 291-296; 2007; Elsevier B.V.
Dolgaev et al., "Formation of Conical Microstructures Upon Laser Evaporation of Solids", Appl. Phys. A, 2001, 73, 177-181.
Duerinckx, et al.; "Optical Path Length Enhancement for >13% Screenprinted Thin Film Silicon Solar Cells"; 2006.
Dulinski, Wojciech et al.; Tests of backside illumincated monolithic CMOS pixel sensor in an HPD set-up; Nuclear Instruments and methods in Physics Research; Apr. 19, 2005; pp. 274-280; Elsevier B.V.
Forbes; "Texturing, reflectivity, diffuse scattering and light trapping in silicon solar cells"; 2012.
Forbes, L. and M.Y. Louie, "Backside Nanoscale Texturing to Improve IR Response of Silicon Photodetectors and Solar Cells," Nanotech, vol. 2, pp. 9-12, Jun. 2010.
Fowlkes et al., "Surface Microstructuring and Long-Range Ordering of Silicon Nanoparticles", Appl. Phys. Lett., 2002, 80 (20), 3799-3801.
Gjessing, J. et al.; 2D back-side diffraction grating for impored light trapping in thin silicon solar cells; Optics Express; vol. 18, No. 6; pp. 5481-5495; Mar. 15, 2010; Optical Society of America.
Gjessing, J. et al.; 2D blazed grating for light trapping in thin silicon solar cells; 3 pages; 2010; Optical Society of America.
Gloeckler et al. Band-Gap Grading in Cu(In,Ga)Se2 Solar Cells, Journal of Physics and Chemistry of Solids; 2005; pp. 189-194; vol. 66.
Goetzberger, et al.; "Solar Energy Materials & Solar Cells"; vol. 92 (2008) pp. 1570-1578.
Han et al., "Evaluation of a Small Negative Transfer Gate Bias on the Performance of 4T CMOS Image Sensor Pixels," 2007 International Image Sensor Workshop, 238-240, Ogunquit, Maine.
Haug, et al.; "Light Trapping effects in thin film silicon solar cells"; 2009.
Her et al., "Microstructuring of Silicon with Femtosecond Laser Pulses," Applied Physics Letters, 1998, 1673-1675, vol. 73, No. 12, American Institute of Physics.
Her et al., "Novel Conical Microstructures Created in Silicon With Femtosecond Laser Pulses", CLEO 1998, 511-512, San Francisco, CA.
Her, et al., "Femtosecond laser-induced formation of spikes on silicon," Applied Physics A, 2000, 70, 383-385.
Hermann, S. et al.; Impact of Surface Topography and Laser Pulse Duration for Laser Ablation of Solar Cell Front Side Passivating SiNx Layers; Journal of Applied Physics; vol. 108, No. 11; pp. 114514-1-114514-8; 2010; American Institute of Physics.
High—Performance Technologies for Advanced Biomedical Applications; .COPYRGT. 2004Brochure; pp. 1-46; PerkinElmerOptoelectronics.
Holland; Fabrication of Detectors and Transistors on High-Resistivity Silicon; Nuclear Instruments and Methods in Physics Research, vol. A275, pp. 537-541 (1989).
Hong et al., "Cryogenic processed metal-semiconductor-metal (MSM) photodetectors on MBE grown ZnSe,", 1999, IEEE Transactions on Electron Devices, vol. 46, No. 6, pp. 1127-1134.
Hsieh et al., "Focal-Plane-Arrays and CMOS Readout Techniques of Infrared Imaging Systems," IEE Transactions on Circuits and Systems for Video Technology, 1997, vol. 7, No. 4, Aug. 1997, 594-605.
Hu et al., "Solar Cells from Basic to Advanced Systems," McGraw Hill Book Co., 1983, 39, New York, New York.
Huang, et al.; "Microstructured silicon photodetector"; Applied Physics Letters 89, 033506; 2006 American Institute of Physics; 2006.
Huang, et al.; "Key Technique for texturing a uniform pyramid structure with a layer of silicon nitride on monocrystalline silicon wafer" Applied Surface Science; 2013 pp. 245-249.

Hüpkes, J. et al.; Light Scattering and Trapping in Different Thin Film Photovoltaic Devices; 24th European Photovoltaic Solar Energy Conference, Hamburg, Germany (Sep. 21-25, 2009); pp. 2766-2769.
Igalson et al. Defect States in the CIGS Solar cells by Photocapacitance and Deep Level Optical Spectroscopy; Bulletin of the Polish Academy of Sciences Technical Sciences; 2005; pp. 157-161; vol. 53(2).
"Infrared Absorption by Sulfur-Doped Silicon formed by Femtosecond Laser Irradiation"; Springer Berline/Heidelberg, vol. 79, Nov. 2004.
Jansen, H. et al., "The Black Silicon Method: a universal method for determining the parameter setting of a flourine-based reactive ion etcher in deep silicon trench etching with profile control",J. Micromech. Microeng. vol. 5, 1995 pp. 115-120.
Job et al., "Doping of Oxidized Float Zone Silincon by Thermal Donors—A low Thermal Budget Doping Method for Device Applications?" Mat. Res. Soc. Symp. Pro.; v. 719, F9.5.1-F9.5.6 (2002).
Joy, T. et al.; Development of a Production-Ready, Back-Illuminated CMOS Image Sensor with Small Pixels; Electron Devices Meeting; pp. 1007-1010; 2007; IEEE.
Juntunen et al.; Advanced Photodiode Detector for Medical CT Imaging: Design and Performance; 2007; pp. 2730-2735; IEEE.
Kim et al.; "Strong Sub-Band-Gap Infrared Absorption in Silicon Supersaturated with Sulfur"; 2006 Appl. Phys. Lett. 88, 241902-1-241902-3.
Koh et al., "Simple nanostructuring on silicon surfaceby means of focused beam patterning and wet etching", Applied Surface Science, 2000 pp. 599-603.
Kolasinski et al., "Laser Assisted and Wet Chemical Etching of Silicon Nanostructures," J. Vac. Sci. Technol., A 24(4), Jul./Aug. 2006, 1474-1479.
Konstantatos et al., "Engineering the Temproal Response of Photoconductive Photodetectors via Selective Introduction of Surface Trap States," Nano Letters, v. 8(5), pp. 1446-1450 (Apr. 2, 2008).
Konstantatos et al., "PbS Colloidal Quantum Dot Photoconductive Photodetectors: Transport, Traps, and Gain," Appl. Phys. Lett., v. 91, pp. 173505-1-173505-3 (Oct. 23, 2007).
Kray, D. et al.; Laser-doped Silicon Soalr Cells by Laser Chemical Processing (LCP) exceeding 20% Efficiency; 33rd IEEE Photovoltaic Specialist Conference; 3 pages; May 2008; IEEE.
Kroning et al.; X-ray Imaging Systems for NDT and General Applications; 2002; Fraunhofer Institute for Nondestructive Testing; Saarbrucken and Dresden, Germany.
Kryski; A High Speed 4 Megapixel Digital CMOS Sensor; 2007 International Image Sensor Workshop; Jun. 6-10, 2007.
Li, "Design and Simulation of an Uncooled Double-Cantilever Microbolometer with the Potential for .about.mK NETD," 2004, Sensors and Actuators A, 351-359, vol. 112, Elsevier B.V.
Li et al., "Gettering in High Resistive Float Zone Silicon Wafers," Transaction on Nuclear Science, vol. 36(1), pp. 290-294 (Feb. 1, 1989).
Li, Hongsong et al.; An experimental study of the correlation between surface roughness and light scattering for rough metallic surfaces; Advanced Characterization Techniques for Optics, Semiconductors, and Nanotechnologies II; 2005; pp. 25780V-1-25780V-15; vol. 5878; SPIE Bellingham, WA.
Lin, A. et al.; Optimization of Random Diffraction Gratings in Thin-Film Solar Cells Using Genetic Algorithms; 2007; 1 page; SSEL Annual Report.
Low Dose Technologies; Power Point.
Madzharov, et al.; "Light trapping in thin-firm silicon solar cells for superstrate and substrate configuration" Abstract #1614, 218.sup.th ECS Meeting .COPYRGT. 2010 the Electrochemical Society.
"Masimo Rainbow SET Pulse CO-Oximetry," 2010, Masimo Corporation, Irvine, California, http://www.masimo.com/Rainbow/about.htm.
Mateus; C.F.R. et al.; Ultrabroadband Mirror Using Low-Index Cladded Subwavelength Grating; Photonics Technology Letters; vol. 16, Issue No. 2; pp. 518-520; Feb. 2004; IEEE.
Matsuno, Shigeru et al.; Advanced Technologies for High Efficiency Photovoltaic Systems; Mitsubishi Electric Advance; vol. 122; pp. 17-19; Jun. 2008.

(56) References Cited

OTHER PUBLICATIONS

Meynants, et al.; "Backside illuminated global shutter COMOS image sensors"; 2011 International Image Sensor Workshop; Jun. 11, 2011.

Moloney, A.M. et al.; Novel Black Silicon PIN Photodiodes; 8 pages; Jan. 25, 2006; SPIE.

Moon et al. Selective emitter using porous silicon for crystalline silicon solar cells. Solar Energy Materials & Solar Cells, v. 93, pp. 846-850 (2009).

Moses; Nuclear Medical Imaging—Techniques and Challenges; Power Point; Feb. 9, 2005; Lawrence Berkeley National Laboratory Department of Functional Imaging.

Murkin, JM and Arangol, M, "Near Infrared spectroscopy as an index of rain and tissue oxygenation," Bri. J. of Anathesia (BJA/PGA Supplement):13-i13 (2009).

Munday, J.N. et al.; Large Integrated Absorption Enhancement in Plasmonic Solar Cells by Combining Metallic Gratings and Antireflection Coatings; Nano Letters; vol. 11, No. 6; pp. 2195-2201; Oct. 14, 2010; American Chemical Society.

Myers, Richard et al., "Enhancing Near-IR Avalanche Photodiodes Performance by Femtosecond Laser Microstructuring" Harvard Dept. of Physics.

Nauka et al., Intrinsic Gettering in Oxygen-Free Silicon; App. Phys. Lett., vol. 46(7), Apr. 4, 1985.

Nauka et al., "New Intrinsic Gettering Process in Silicon Based on Interactions of Silicon Interstitials," J. App. Phys., vol. 60(2), pp. 615-621, Jul. 15, 1986.

Nayak et al, "Semiconductor Laesr Crystallization of a--Si:H," SPIE Digital Library, 2003, 277-380, vol. 4977, Bellingham, Washington. 2003.

Nayak et al, "Ultrafast-Laser-Assisted Chemical Restructuring of Silicon and Germanium Surfaces," Applied Surface Science, 2007, 6580-6583, vol. 253, Issue 15, Elsevier B.V.

Nayak et al, "Semiconductor Laser Crystallization of a--Si:H on Conducting Tin-Oxide-Coated Glass for Solar Cell and Display Applications," Applied Physics A, 2005, 1077-1080, 80, Springer Berlin, Heidelberg, Germany.

Nayak, B.K. et al.; Ultrafast Laser Textured Silicon Solar Cells; Mater. Res. Soc. Symp. Proc.; vol. 1123; 6 pages; 2009; Materials Research Society.

Nayak, et al.; "Efficient light trapping in silicon solar cells by ultrafast-laser-induced self-assembled micro/nano structures"; Progress in Photovoltaics: Research and Applications; 2011.

Oden, et al.; "Optical and Infrared Detection Using Microcantilevers;" SPIE Digital Library on Oct. 13, 2010; vol. 2744; 10 pages.

Pain, Bedabrata; Backside Illumination Technology for SOI-CMOS Image Sensors; 2009 IISW Symposium on Backside Illujination of Solid-State Image Sensors, Bergen Norway; Jun. 25, 2009; pp. 1-23.

Pain, Bedabrata; "A Back-Illuminated Megapixel CMOS Image Sensor"; http://hdl.handle.net/2014/39312; May 1, 2005.

Palm et al. CIGSSe Thin Film PB Modules: From Fundamental Investigators to Advanced Performance and Stability; Thin Solid Films; 2004; pp. 544-551; vol. 451-2.

Payne, D.N.R. et al.; Characterization of Experimental Textured ZnO:Al Films for Thin Film Solar Cell Applications and Comparison with Commercial and Plasmonic Alternatives; Photovoltaic Specialists Conference (PVSC); pp. 1560-1564; 2010; IEEE.

Pedraza et al., "Silicon Microcolumn Arrays Grown by Nanosecond Pulsed-Excimer Laser Irradiation", Appl. Phys. Lett., 1999, 74 (16), 2322-2324, American Institute of Physics.

Pedraza et al., "Surface Nanostructuring of Silicon", Appl. Phys. A, 2003, 77, 277-284.

Rashkeev et al., "Hydrogen passivation and Activation of Oxygen Complexes in Silicon," American Institute of Physics, vol. 78(11), pp. 1571-1573 (Mar. 12, 2001).

Russell, et al.; "Nanosecond Eximer Laser Processing for Novel Microelectronic Fabrication"; Nanosecond Excimer Laser Processing; 6 pages; 1989.

Russell, Ramirez and Kelley, "Nanosecond Excimer Laser Processing for Novel Microelectronic Devices," US Navy, SPAWAR, San Diego, Techical Report, 2003.

Russell, Ramirez, Kelley, "Nanosecond Excimer Laser Processing for Novel Microelectronic Fabrication," SSC Pacific Technical Reports , pp. 228-233, 2003, vol. 4, US Navy.

Sai, H. et al.; Enhancement of Light Trapping in Thin-Film Hydrogenated Microcrystalline Si Solar Cells Using Back Reflectors with Self-Ordered Dimple Pattern; Applied Physics Letters; vol. 93; 2008; American Institute of Physics.

Sanchez et al., "Whiskerlike Structure Growth on Silicon Exposed to ArF Excimer Laser Irradiation", Appl. Phys. Lett., 1996, 69 (5), 620-622.

Sanchez et al., "Dynamics of the Hydrodynamical Growth of Columns on Silicon Exposed to ArF Excimer-Laser Irradiation", Appl. Phys. A, 66, 83-86 (1998).

Sarnet et al.; "Femtosecond laser for black silicon and photovoltaic cells"; Feb. 21, 2008, Proc. of SPIE; vol. 6881; pp. 1-15.

Senoussaoui, N. et al.; Thin-Film Solar Cells with Periodic Grating Coupler; Thin Solid Films; pp. 397-401; 2003; Elsevier B.V.

Serpenguzel et al., "Temperature Dependence of Photluminescence in Non-Crystalline Silicon", Photonics West (San Jose, CA, 2004) 454-462.

Shen et al., "Formation of Regular Arrays of Silicon Micorspikes by Femotsecond Laser Irradiation Through a Mask", Appl. Phys. Lett., 82, 1715-1717 (2003).

Solar Energy Research Institute, "Basic Photovoltaic Principles and Methods," Van Nostrand Reinhold Co., NY 1984, pp. 45-47 and 138-142.

Solhusvik, J. et al. "A 1280x960 3.75um pixel CMOS imager with Triple Exposure HDR," Proc. of 2009 International Image Sensor Workshop, Bergen, Norway, Jun. 22-28, 2009.

Stone et al.; The X-ray Sensitivity of Amorphous Selenium for Mammography;.Am. Assoc. Phys. Med.; Mar. 2002; pp. 319-324; vol. 29 No. 3; Am. Assoc. Phys. Med.

Szlufcik, J. et al.; Simple Integral Screenprinting process for selective emitter polycrystalline silicon solar cells; Applied Physics Letters; vol. 59, No. 13; Sep. 23, 1991; American Institute of Physics.

Tabbal et al., "Formation of Single Crystal Sulfur Supersaturated Silicon Based Junctions by Pulsed Laser Melting". 2007, J. Vac. Sci. Technol. B25(6), 1847-1852.

Takayanagi, et al.; "A 600.times.600 Pixel, 500, fps CMOS Image Sensor with a 4.4 jum Pinned Photodiode 5-Transistor Global Shutter Pixel"; 2007 International Image Sensor Workshop; Jun. 6-10, 2007.

Tower, John R. et al.; Large Format Backside Illuminated CCD Imager for Space Surveillance; IEEE Transactions on Electron Devices, vol. 50, No. 1; Jan. 2003; pp. 218-224.

Tull; "Femtosecond Laser Ablation of Silicon: Nanoparticles, Doping and Photovotaics"; Harvard University, Jun. 2007 (Thesis).

Uehara et al., "A High-Sensitive Digital Photosensor Using MOS Interface-Trap Charge Pumping," IEICE Electronics Express, 2004, vol. 1, No. 18, 556-561.

Wilson, "Depth Distributions of Sulfur Implanted Into Silicon as a Function of Ion energy, Ion Fluence, and Anneal Temperature," 1984, Appl. Phys. 55(10, 3490-3494.

Winderbaum, S. et al.; Reactive ion etching (RIE) as a method for texturing polycrystalline silicon solar cells; Solar Energy Materials and Solar Cells; 1997; pp. 239-248; Elsevier Science B.V.

Wu et al., "Black Silicon" Harvard UPS 1999.

Wu et al., "Black Silicon: A New Light Absorber," APS Centennial Meeting (Mar. 23, 1999).

Wu et al., "Femtosecond laser-gas-solid interactions," Thesis presented to the Department of Physics at Harvard University, pp. 1-113, 126-136, Aug. 2000.

Wu et al., "Visible Luminescence From Silicon Surfaces Microstructured in Air". Appl. Phys. Lett., vol. 81, No. 11, 1999-2001 (2002).

Wu, et al "Near-Unity Below-Band-Gap Absorption by Microstructured Silicon," 2001, Applied Physics Letters, 1850-1852, vol. 78, No. 13, American Institute of Physics.

(56) References Cited

OTHER PUBLICATIONS

Xu, Y., et al, "Infrared Detection Using Thermally Isolated Diode," Sensors and Actuators A, Elsevier Sequoia S.A., 1993, vol. 36, 209-217, Lausanne, Switzerland.
Yablonovitch, et al.; "Intensity Enhancement in Textured Optical Sheets for Solar Cells"; .COPYRGT. 1982 IEEE.
Yamamoto, K. et al.; NIR Sensitivity Enhancement by Laser Treatment for Si Detectors; Nuclear Instruments and Methods in Physics Research A; pp. 520-523; Mar. 31, 2010; Elsevier.
Yan, B.; Light Trapping Effect from Randomized Textures of Ag/ZnO Back Reflector on Hyrdrogenated Amorphous and Nanocrystalline Silicon Based Solar Cells; Thin Film Solar Technology II; vol. 7771; 2010; SPIE.
Yasutomi, et al.; "Two-Stage Charge Transfer Pixel Using Pinned Diodes for Low-Noise Global Shutter Imaging"; 2009 International Image Sensor Workshop; Mar. 28, 2009.
Younkin et al., "Infrared Absorption by Conical Silicon Microstructures Made in a Variety of Background Gases Using Femtosecond-Laser Pulses", J. Appl. Phys., 93, 2626-2629 (2003).
Younkin, "Surface Studies and Microstructure Fabrication Using Femtosecond Laser Pulses," Thesis presented to the Division of Engineering & Applied sciences at Harvard University (Aug. 2001).
Yuan, et al.; "Efficient black silicon solar cell with a density-graded nanoporous surface: Optical properties, performance limitations, and design rules"; American Institute of Physics; Applied Physics Letters 95. 1230501 (2009) 3 pages.
Zaidi, S.H. et al.; Diffraction Grating Structures in Solar Cells; Photovoltaic Specialists Conference, 2000; 4 pages; Sep. 2000; IEEE.
Zhang et al, "Ultra-Shallow P+-Junction Formation in Silicon by Excimer Laser Doping: a Heat and Mass Transfer Perspective," Int. J. Heat Mass Transfer, 1996, 3835-3844, vol. 39, No. 18, Elsevier Science Ltd., Great Britain.
Zhu et al., "Evolution of Silicon Surface Microstructures by Picosecond and Femtosecond Laser Irradiations," Applied Surface Science, 2005, 102-108, Elsevie, Amsterdam, NL.Ultra-Shallow P+-Junction Formation in Silicon by Excimer Laser Doping: a Heat and Mass Transfer Perspective, Int. J. Heat Mass Transfer, 1996, 3835-3844, vol. 39, No. 18, Elsevier Science Ltd., Great Britain.
Zhong, S. et al. "Excellent Light Trapping in Ultrathin Solar Cells," AFM-Journal, May 2016 pp. 1-11.
Ziou et al., "Depth from defocus using the hermite transform", Image Processing, 1998. ICIP 98. Intl. Conference on Chicago, IL. Oct. 1998 pp. 958-962.
English translation of Japanese Office Action in corresponding JP Application No. 2014-520387 dated Jul. 26, 2016 (6 pages).
Extended European Search Report in corresponding EP Application No. 14740538.5 dated Aug. 12, 2016 (11 pages).
Campbell, Stephen A., "The Science and Engineering of Microeletronic Fabrication, 2nd Ed.", Oxford University Press, 2001, pp. 406-411.
Carey, P.G. et al., "In-situ Doping of Silicon Using Gas Immersion Laser Doping (GILD) Process," Appl. Surf. Sci. 43, 325-332 (1989).
Gibbons, J., "Ion Implantation in Semiconductors—Part II; Damage Production and Annealing", Proceedings of the IEEE vol. 60, No. 9 pp. 1062-1096. Jun. 1972.
Ohring, Milton."The Materials of Science of Thin Films"; pp. 176-179; Academic Press, 1992.
Agranov, et al., Pixel continues to shrink . . . Small Pixels for Novel CMOS Image Sensors, 4 pages.
Byung Jun Park et al, Jpn. J. Appl. Phys. 46 2454, 2007, 5 pages.
Choubey et al., On Evolution of CMOS Image Sensors, Proceedings of the 8th International Conference on Sensing Technology, Sep. 2-4, 2014, Liverpool, UK, pages.
Fontaine, A Review of the 1.4 µm Pixel Generation, Technology Analysis Group Chipworks Inc., 2011, 4 pages.
Fontaine, Ray, A Survey of Enabling Technologies in Successful Consumer Digital Imaging Products (Part 3: Pixel Isolation Structures), http://www.techinsights.com, Jul. 24, 2017, 13 pages.

http://electroiq.com/insights-from-leading-edge/2016/09/iftle-303-sony-introduces-ziptronix-dbi-technology-in-samsung-galaxy-s7, "Omnivision was the first to sample BSI in 2007 but costs were too high and adoption was thus very low", (2016).
http://joseph-tang.blogspot.com/2017/, Oshiyama et al. , Near-infrared Sensitivity Enhancement of a Back-illuminated Complementary Metal Oxide Semiconductor Image Sensor with a Pyramid Surface for Diffraction Structure, (2017).
https://blogs.yahoo.co.jp/miyabiman_now/25628945.html.
IMEC, 3D Integrated Image Sensors for Smart Imaging Systems, Piet De Moor, 2010, 32 pages.
Itonaga et al., "Extremely-low-noise CMOS Image Sensor with high saturation capacity," 2011 International Electron Devices Meeting, Washington, DC, 2011, pp. 8.1.1-8.1.4.
Kitamura et al., "Suppression of crosstalk by using backside deep trench isolation for 1.12µm backside illuminated CMOS image sensor," 2012 International Electron Devices Meeting, San Francisco, CA, 2012, pp. 24.2.1-24.2.4.
Korean Intellectual Property Office (KIPO), CMOS Image Sensor, KIPO, 2004, 29 pages.
Lee et al., SNR Performance Comparison of 1.4µm Pixel : FSI, Light-guide, and BSI, 2011, 3 pages.
Minoglou et al., "Reduction of Electrical Crosstalk in Hybrid Backside Illuminated CMOS Imagers using Deep Trench Isolation," 2008 International Interconnect Technology Conference, Burlingame, CA, USA, 2008, pp. 129-131.
Munck, Generic building blocks for 3D integration and their application on hybrid CMOS image sensors, Katholieke Universiteit Leuven, Kapeldreef 75—B-3001 Heverlee, Sep. 2008, 328 pages.
Park et al., "Deep Trench Isolation for Crosstalk Suppression in Active Pixel Sensors with 1.7µm Pixel Pitch", in Japanese Journal of Applied Physics, vol. 46, No. 4B, pp. 2454-5457, 2007.
Rao, et al., Monolithic and Fully-Hybrid Backside Illuminated CMOS Imagers for Smart Sensing, IMEC, Kapeldreef 75, B-3001 Leuven, Belgium, 4 pages.
STMicroelectronics, BSI—technical challenges, IISW-2009, Bergen. Jun. 25, 2009, 37 pages.
Tournier, et al., Pixel-to-Pixel isolation by Deep Trench technology, STMicroelectronics, 850, rue Jean Monnet—F-38926 Crolles Cedex—France, 2011, 4 pages.
Tournier, et al., Pixel-to-Pixel isolation by Deep Trench technology: Application to CMOS Image Sensor, https://www.researchgate.net/publication/268300742, 2011, 5 pages.
Xiong , Y., et al, "Depth from focusing and defocusing", Computer Vision and Pattern Recognition, 1993. Proceedings CVPR '93., 1993 IEEE , Los Alamitos, CA, USA.IEEE Comput. Soc, Jun. 15, 1993 (Jun. 15, 1993), pp. 68-73.
Yaung et al., "High performance 300mm backside illumination technology for continuous pixel shrinkage," 2011 International Electron Devices Meeting, Washington, DC, 2011, pp. 8.2.1-8.2.4.
Aberle, Progress with polycrystalline silicon thin-film solar cells on glass at UNSW. Journal of Crystal Growth 287,386-390 (2006).
Amoruso et al., Emission of nanoparticles during ultrashort laser irradiation of silicon targets. Europhysics Letters 67, 404-410 (2004).
Arango et al., Charge transfer in photovoltaics consisting of interpenetrating networks of conjugated polymer and $TiO_2$ nanoparticles. Applied Physics Letters 74, 1698-1700 (1999).
Beek et al., Efficient hybrid solar cells from zinc oxide nanoparticles and a conjugated polymer. Advanced Materials 16, 1009-1013 (2004).
Bentini et al., Surface doping of semiconductors by pulsed-laser irradiation in reactive atmosphere. Applied Physics A: Materials Science & Processing. 1988;45(4):317-324.
Blood et al., Electrical Characterization of Semiconductors. Reports on Progress in Physics 41, 157-257 (1978).
Bouhdata, A. et al. "Modeling of the Spectral Response of Pin Photodetectors Impact of Exposed Zone Thickness, Surface Recombination Velocity and Trap Concentration", Microelectronics Reliability 44, pp. 223-228 (2004).
Brus, Luminescence of Silicon Materials-Chains, Sheets, Nanoclystals, Nanowires, Microcrystals, and Porous Silicon. Journal of Physical Chemistry 98,3575-3581 (1994).

(56) References Cited

OTHER PUBLICATIONS

Bucksbaum et al., Rapid Melting and Regrowth Velocities in Silicon Heated by Ultraviolet Picosecond Laser-Pulses, Physical Review Letters 53, 182-185 (1984).
Bulgakov et al., Silicon clusters produced by femtosecond laser ablation: non-thermal emission and gas-phase condensation. Applied Physics AMaterials Science & Processing 79, 1591-1594 (2004).
Campbell et al., Light Trapping Properties of Pyramidally Textured Surfaces. Journal of Applied Physics 62, 243-249 (1987).
Carey et al, "High Sensitivity Silicon-Based VIS/NIR Photodetectors", CLEO 2004 (San Francisco, CA 2004) pp. 1-2 cited by other.
Carey et al. "High Sensitivity Silicon-Based VISNIR Photodetectors" CLEO 2004 (San Francisco CA 2003) 1-2.
Carey et al., In-situ doping of silicon using the gas immersion laser doping (GILD) process. Applied Surface Science. vol. 43, Issues 1-4, Dec. 2, 1989, pp. 325-332.
Carey et al., Visible and near-infared responsivity of femtosecondlaser microstrnctured silicon photodiodes. Opt. Lett. 2005;30: 1773- 5.
Carey, Femtosecond-laser microstructuring of silicon for novel optoelectronic devices. Thesis. The Division of Engineering and Applied Sciences. Harvard University. Cambridge, MA. Jul. 2004 162 pages.
Cifre, Polycrystalline Silicon Films Obtained by Hot-Wire Chemical-Vapor-Deposition. Applied Physics aMaterials Science & Processing 59, 645-651 (1994).
Contreras et al., Progress toward 20% efficiency in Cu(In,Ca)Se-2 polycrystalline thin-film solar cells. Progress in Photovoltaics 7, 311-316 (1999).
Cuadra et al., Present status of intermediate band solar cell research. Thin Solid Films 451-52, 593-599 (2004).
Curtins et al., High-Rate Deposition of Amorphous Hydrogenated Silicon-Effect of Plasma Excitation-Frequency. Electronics Letters 23, 228-230 (1987).
Delley et al., Quantum Confinement in Si Nanocrystals. Physical Review B 47, 1397-1400 (1993).
Glezer et al., Ultrafast-laser driven micro-explosions in transparent materials. Applied Physics Letters 71, 882-884 ( 1997).
Glover et al., Probing paiticle synthesis during femtosecond laser ablation: initial phase transition kinetics. Applied Physics B Lasers and Optics 78, 995-1000 (2004).
Glover, Hydrodynamics of particle formation following femtosecond laser ablation. Journal of the Optical Society of America B-Optical Physics 20, 125-131 (2003).
Goetzbergeret al., Crystalline Silicon Solar Cells (ed.), Chapter 6, High Efficiency Solar Cells. New York: John Wiley & Sons Ltd, 1994.
Green, Recent developments in photovoltaics. Solar Energy 76, 3-8 (2004).
Greenham et al., Charge sepai•ation and transport in conjugatedpolymerjsemiconductor-nanocrystal composites studied by photoluminescence quenching and photoconductivity. Physical Review B 54, 17628-17637 (1996).
Halls et al., Efficient Photodiodes from Interpenelsating Polymer Networks. Nature 376, 498-500 (1995).
Hansen, Henri et al. "The Black Silicon Method: A Universal Method for determining the Parameter Setting of a Fluorine-Based Reactive Ion Etcher in Depp Silicon Trench Etching With Profile Control", J. Micromedch. Microeng. 5 (1'995) pp. 115-120.
Heisterkamp et al., Pulse energy dependence of subcellular dissection by femtosecond laser pulses. Optics Express 13, 3690-3696 (2005).
Herny, Limiting Efficiencies of Ideal Single and Multiple Energy Gap Terrestrial Solar-Cells. Journal of Applied Physics 51, 4494-4500 (1980).
Huang et al., "A uniform 290 nm periodic Square Strcuture on ZnO Fabricated by Two-Beam Femtosecond Laser Ablation," Nanotechnolgoy, 8 pp. 1-6 (2007).

Keppner et al., Passivation Properties of Amorphous and Microcrystalline Silicon Layers Deposited by Vhf-Gd for Crystalline Silicon Solar-Cells. Solar Energy Materials and Solar Cells 34, 201-209 (1994).
Luque et al., Increasing the efficiency of ideal solar cells by photon induced transitions at intermediate levels. Physical Review Letters 78, 5014-5017 (1997).
Marti et al., Limiting efficiencies for photovoltaic energy conversion in multigap systems. Solar Energy Materials and Solar Cells 43, 203-222 (1996).
Meier et al., Recent progress in micromorph solar cells. Journal of Non-Crystalline Solids 230, 1250-1256 (1998).
Meier etal., Complete Microclystalline P-1-N. SolarCell-Crystalline or Amorphous Cell Behavior. Applied Physics Letters 65, 860-862 (1994).
Mo et al., Sulfm point defects in crystalline and amorphous silicon. Physical Review B 70 (2004).
Morneault, K. et al., "ISDN Q.921-User Adaptation Layer," Network Working Group, Request for Comments: 3057, The Internet Society, pp. 1-66, (2001).
Morneault, K. et al., "SS7 MTP2-User Adaptation Layer," Network Working Group, Internet Draft, The Internet Engineering Task Force, pp. 1-94, (Feb. 2001).
Myers et al., Enhancing nearinfrared avalanche photodiode performance by femtosecond laser microstructuring. Applied Optics 45, 8825-8831 (2006).
Nayak et al.; "Femtosecond Laser-Induced Micro-Structuring of Thin a-Si:H Films", Material Research Society Symposium proceeedings; vol. 850; Nov. 28-Dec. 2, 2004; pp. MM1.8.1-MM 1.8.5.
Nirmal et al., Lwninescence photophysics in semiconductor nanocrystals. Accounts of Chemical Research 32. 407-414 (1999).
Ong et al., "Framework Architecture for Signaling Transport," Network Working Group, Request for Comments: 2719, The Internet Society, pp. 1-24, (Oct. 1999).
O'Regan et al., A Low-Cost, High-Efficiency Solar-Cell Based on DyeSensitized Colloidal Tio2 Films. Nature 353, 737-740 (1991).
Pavesi, Optical gain in silicon nanocrystals. Nature 408, 440-444 (2000).
Rath et al., Limited influence of grain boundary defects in hot-wire CVD polysilicon films on solar cell performance. Journal of Non-crystalline Solids 230, 1277-1281 (1998).
Reber et al., Crystalline silicon thin-film solar cellsrecent results at Fraunhofer ISE, Solar Energy 77, 865-875 (2004).
Sarnet et al., Laser doping for microelectronics and microtechnology. Proc.of SPIE vol. 5448 pp. 669-680.
Schaffer et al., Micromachining bulk glass by use offemtosecond laser pulses with nanojoule energy. Optics Letters 26, 93-95(2001).
Schuppler et al., Size, Shape, and Composition of Luminescent Species in Oxidized Si Nanocrystals and H-Passivated Porous Si. Physical Review B 52, 4910-4925 (1995).
Serpenguzel et al., "Temperature Dependence of Photoluminescence in Non-Crystalline Silicon", Photonics West (San Jose, CA, 2004) 454-462.
Seto, Electrical Properties of Polyclystalline Silicon Films. Jomnal of Applied Physics 46, 5247-5254 (1975).
Shali et al., Thin-film silicon solar cell technology. Progress in Photovoltaics 12, 113-142 (2004).
Sheehy et al., Chalcogen doping of silicon via intense femtosecondlaser irradiation. Materials Science and Engineering B-Solid State Materials for Advanced Technology 137, 289-294 (2007).
Sheehy et al., Role of the Background Gas in the Morphology and Optical Properties of Laser-Microstructured Silicon. Chem Mater. 2005; 17(14):3582-6.
Shen et al., "Femtosecond laser-induced formation of submicrometer spikes on silicon in water", Appllied Physics Letter, vol. 85(23 ), p. 5694 (2004).
Shockley et al., Detailed Balance Limit ofEfficiency of p-n. Junction Solar Cells. Journal of Applied Physics 32,510-519 (1961).
Sidebottom, G. et al., "SS7 MTP3-User Adaptation Layer (M3UA)," Network Working Group, Internet Draft, The Internet Engineering Task Force, pp. 1-128, (Feb. 2001).
Sipe et al., Laser-Induced Periodic Surface-Structure .1. Theory. Physical Review B 27, 1141-1154 (1983).

(56) References Cited

OTHER PUBLICATIONS

Slaoui et al., Advanced inorganic materials for photovoltaics. Mrs Bulletin 32, 211-218 (2007).
Staebler et al., Stability of N-I-P. Amorphous-Silicon Solar-Cells. Applied Physics Letters 39, 733-735 (1981).
Stalmans et al. Porous silicon in crystalline silicon solar cells: a review and the effect on the internal quantum efficiency. Progress in Photovoltaics 6 233-246 (1998).
Stewart, R. et al. "Stream Control Transmission Protocol", Network Working Group, pp. 1-134 (Oct. 2000).
Stocks et al., Texturing ofpolycrystalline silicon. Solar Energy Materials and Solar Cells 40, 33-42 (1996).
Stupca et al., Enhancement of polycrystalline silicon solar cells using ultrathin films of silicon nanoparticle. Applied Physics Letters 91, 063107 (2007).
Svrcek et al., Ex situ prepared Si nanocrystals embedded in silica glass: Formation and characterization. Journal of Applied Physics 95, 3158-3163 (2004).
Svrcek et al., Silicon nanocrystals as light converter for solar cells. Thin Solid Films 451-52, 384-388 (2004).
Tiwari et al., A silicon nanocrystals based memoly. Applied Physics Letters 68, 1377-1379 (1996).
Torres et al., Device grade microcrystalline silicon owing to reduced oxygen contamination, Applied Physics Letters 69, 1373-1375 (1996).
Tull et al., Formation of silicon nanoparticles and web-like aggregates by femtosecond laser ablation in a background gas. Applied Physics a-Materials Science & Processing 83, 341-346 (2006).
Tull et al., Silicon surface morphologies after femtosecond laser irradiation, Mrs Bulletin 31, 626-633 (2006).
van der Zel, L. "SF6 and the Environment," EPRI, Nov. 2003.
Vigue, F. et al. "Visible-blind Ultraviolet Photodetectors based on ZnMgBeSe" Journal of Electronic Materials, vol. 30, No. 6, pp. 4190-4192 (2001).
Wilson et al., Quantum Confinement in Size-Selected, Surface-Oxidized Silicon Nanocrystals. Science 262, 1242-1244 (1993).
Wronski, Electronic Properties of Amorphous Silicon in Solar-Cell Operation leee Transactions on Electron Devices 24, 351-357 (1977).
Wu et al., "13.9%—efficient CdTe polycrystalline thin-film solar cells with an infrared transmission of~so%", Progress in Photovoltaics 14, 471-483 (2006).
Younkin, R. et al. "Infrared absorption by conical silicon microstrnctures made in a variety of background gases using femtosecond-laserpulses," Proc. CLEO 2001 (Baltimore, MD, 2001) p. 556.
Yu et al., Polymer Photovoltaic CellsEnhanced Efficiencies Via a Network ofInternal Donor-Acceptor Heterojunctions. Science 270, 1789-1791 (1995).
Zhao et al., 19.8% efficient "honeycomb" textured multicrystalline and 24.4% monocrystalline silicon solar cells. Applied Physics Letters 73, 1991-1993 (1998).

* cited by examiner

| 906 | 902 | 906 | 902 |
|-----|-----|-----|-----|
| 904 | 906 | 904 | 906 |
| 908 | 908 | 908 | 908 |
| 906 | 902 | 906 | 902 |
| 904 | 906 | 904 | 906 |
| 908 | 908 | 908 | 908 |

FIG. 9c

BIOMETRIC IMAGING DEVICES AND ASSOCIATED METHODS

PRIORITY DATA

The present application claims benefit of U.S. Patent Application bearing the Ser. No. 13/549,107, filed on Jul. 13, 2012, entitled "Biometric Imaging Devices and Associated Methods", which claims benefit of U.S. Provisional Application bearing the Ser. No. 61/507,488, entitled "Biometric Imaging Devices and Associated Methods", filed on Jul. 13, 2011, which is incorporated herein by reference.

BACKGROUND

Biometrics is the study of signatures of a biological origin that can uniquely identify individuals. Biometric technology has increased in interest in recent years, and can be classified in two groups, cooperative identification and non-cooperative identification. Cooperative biometric identification methods obtain biometric readings with the individual's knowledge, and typically detect biological signatures such as finger prints, palm prints, and iris scans. Non-cooperative biometric identification methods obtain biometric readings without the person's knowledge, and typically detect facial, speech, and thermal signatures of an individual. This disclosure focuses on devices and methods that can detect various biometric signatures of both cooperative and non-cooperative individuals, through the use of imaging devices.

Facial and iris detection are some of the more common signatures used by security applications for identifying individuals. These methods of detection involve two independent steps, an enrollment phase where biometric data is collected and stored in a database and a query step, where unknown biometric data is compared to the database to identify the individual. In both of these steps, a camera can be used to collect and capture the images of the individual's face or iris. The images are processed using algorithms that deconstruct the image into a collection of mathematical vectors which, in aggregate, constitute a unique signature of that individual.

Digital imaging devices are often utilized to collect such image data. For example, charge-coupled devices (CCDs) are widely used in digital imaging, and have been later improved upon by complementary metal-oxide-semiconductor (CMOS) imagers having improved performance. Many traditional CMOS imagers utilize front side illumination (FSI). In such cases, electromagnetic radiation is incident upon the semiconductor surface containing the CMOS devices and circuits. Backside illumination CMOS imagers have also been used, and in many designs electromagnetic radiation is incident on the semiconductor surface opposite the CMOS devices and circuits.

As a major caveat to biometric signature acquisition, however, pigmentation of the skin and/or iris can affect the ability to collect robust data, both in the enrollment phase as well as in the future query phase. The pigmentation can mask or hide the unique structural elements that define the values of the signature mathematical vectors.

SUMMARY

The present disclosure provides systems, devices, and methods for identifying an individual in both cooperative and non-cooperative situations. In one aspect, for example, a system for identifying an individual can include a light source capable of emitting electromagnetic radiation having at least one wavelength of from about 700 nm to about 1200 nm, and an imager device positioned to receive the electromagnetic radiation upon reflection from an individual to generate an electronic representation of the individual. The system can also include an image processing module functionally coupled to the imager device to receive the electronic representation. The image processing module processes the electronic representation into an individual representation having at least one substantially unique identification trait. The imager device can include a semiconductor device layer having a thickness of less than about 10 microns, at least two doped regions forming a junction, and a textured region positioned to interact with the electromagnetic radiation. The imaging device has an external quantum efficiency of at least about 33% for electromagnetic radiation having at least one wavelength of greater than 800 nm.

Various light sources are contemplated, and any light source capable of delivering electromagnetic radiation within the ranges utilized by the present devices and systems is considered to be within the present scope. In one aspect, for example, the light source can be an active light source. In yet another aspect, the light source may be a passive light source or in other words ambient light from the surroundings. In another aspect, the active light source can be two or more active light sources each emitting infrared electromagnetic radiation at distinct peak emission wavelengths. In one specific aspect, the two or more active light sources can emit infrared electromagnetic radiation at about 850 nm and about 940 nm. In another aspect the two or more active light sources can emit infrared electromagnetic radiation at about 850 nm and about 1060 nm.

The semiconductor device layer used in the imager device can include any useful semiconductor material. In one aspect, however, the semiconductor device layer can be comprised of silicon. In one specific aspect, a silicon-based imager device having device layer with a thickness less than about 10 microns can have a response time of from about 0.1 ms to about 1 ms and an external quantum efficiency of at least about 33% for electromagnetic radiation having at least one wavelength of greater than 800 nm. In another aspect, the response time can be from about 0.1 ms to about 16 ms. In yet another specific aspect, a silicon-based imager device having a semiconductor device layer with a thickness less than about 10 microns can have a response time of from about 0.1 ms to about 1 ms and an external quantum efficiency of at least about 11% for electromagnetic radiation having at least one wavelength of greater than 940 nm.

In another aspect, the imager device is capable of capturing the electronic representation with sufficient detail to identify the at least one substantially unique identification trait using electromagnetic radiation emitted from the active light source having at least one wavelength of from about 700 nm to about 1200 nm and having a scene radiance impinging on the individual at 3 meters that is at least 0.1 mW/mm$^2$. In yet another aspect, the imager device is capable of capturing the electronic representation with sufficient detail to identify the at least one substantially unique identification trait using electromagnetic radiation emitted from the active light source having at least one wavelength of from about 800 nm to about 1000 nm and having a scene radiance impinging on the individual at 3 meters that is from about 1.0 mW/mm$^2$ to about 100 mW/mm$^2$. In a further aspect, the imager device can operate on an electronic global shutter to capture the electronic representation.

In yet another aspect, the system can include an analysis module functionally coupled to the image processing module, wherein the analysis module is operable to compare the at least one substantially unique identification trait with a known identification trait to facilitate identification of the individual.

In a further aspect, the system can include an automatic pan and zoom module operable to move at least one of the light source or the imager device in order to track the individual.

In some aspects, the imager device can include at least two imager devices. In one specific aspect, the at least two imager devices includes a first imager device positioned and operable to generate a facial electronic representation of the individual and a second imager device positioned and operable to generate an iris electronic representation of the individual. In another specific aspect, the system can include an automatic pan and zoom module operable to move at least one of the light source or the imager device and a process module to analyze the facial electronic representation and provide the pan and zoom module coordinates for the face and iris.

In some aspects, the system can be configured to be concealed from the individual being identified. In one aspect, for example, the system can be concealed from the individual behind an infrared transparent medium that is visually opaque. The infrared transparent medium can be a plane of glass or plastic being at least partially coated with an infrared transparent paint or other infrared transparent medium. In one aspect metal particles can be impregnated into at least a portion of the infrared transparent medium. In yet another aspect, quantum dots may be disposed on the infrared transparent medium such that infrared light is transmitted through the medium and visible light is filtered. In another aspect, the system can be activated by a trigger from the individual, whether the individual has knowledge of the trigger or not. The trigger can be a transistor or sensor integrated in the system that is capable of activating the system. Such triggers can be a thermal sensor, motion sensor, photosensor and other like sensors.

The system can also be designed to be of a small size. For example, in one aspect the light source, the imager device, and the image processing module can collectively have a size of less than about 160 cubic centimeters. In another aspect, the light source, the imager device, and the image processing module can collectively have a size of less than about 16 cubic centimeters. In yet another aspect, the imager device can have an optical format of about 1/7 inches.

It is also contemplated that the present systems and devices can be utilized in a variety of other systems, devices, and situations. For example, in one aspect the present system can be integrated into an electronic device. While any electronic device is contemplated, non-limiting examples can include a mobile smart phone, a cellular phone, a laptop computer, a tablet computer, other personal electronic devices and the like. Various situations are also contemplated wherein such integration can be useful. For example, in one aspect such an electronic device can provide positive identification of an individual in order to unlock the electronic device. In another aspect, positive identification of the individual can be used to verify the individual in a financial transaction. In another aspect, the positive identification can be used to determine citizenship of the individual or to verify passport or license status.

The present disclosure additionally provides methods of identifying an individual. In one aspect, such a method can include emitting infrared electromagnetic radiation having at least one wavelength of from about 700 nm to about 1200 nm toward the individual, receiving the infrared electromagnetic radiation reflected from the individual into an imager device to generate an electronic representation of the individual, processing the electronic representation into an individual representation having at least one substantially unique identification trait, and using the at least one substantially unique identification trait to identify the individual. The imager device can include a semiconductor device layer having a thickness of less than about 10 microns, at least two doped regions forming a junction, and a textured region positioned to interact with the electromagnetic radiation. The imaging device can have an external quantum efficiency of at least about 33% for electromagnetic radiation having at least one wavelength of greater than 800 nm.

In one specific aspect, the at least one substantially unique identification trait can include an electronic representation of an iris of the individual sufficient to identify the individual. In one specific aspect, the electronic representation of the iris can be captured by the imager device at a distance of from about 0.5 meters to about 15 meters from the individual. In yet another specific aspect, the electronic representation of the iris can be captured by the imager device at a distance of from about 2 meters to about 10 meters from the individual. In a further specific aspect, the electronic representation of the iris can be captured at a distance of greater than 2 meters from the imager device to the individual using the infrared electromagnetic radiation having a wavelength of at least 940 nm and an intensity that is below 10,000 mW/mm$^2$/steradian.

In yet another aspect, emitting infrared electromagnetic radiation can further include emitting infrared electromagnetic radiation from at least two active light sources, each emitting at distinct peak emission wavelengths. In such cases, electronic representations from each active light source can be processed into individual representations each having at least one substantially unique identification trait, and each individual representation can then be compared with one another to verify identification results of the individual.

In one aspect, capturing the electronic representation by the imager device can be accomplished by a global electronic shutter mechanism. In one specific aspect, the global electronic shutter can be operated with an integration time of from about 0.1 ms to about 1 ms. In another specific aspect, the individual can be moving with respect to the imager device and the integration time is sufficient to capture the electronic representation with sufficient detail to identify the at least one substantially unique identification trait.

In another aspect, the method can include comparing the at least one substantially unique identification trait with a known identification trait to facilitate identification of the individual. A variety of known identification traits are contemplated, non-limiting examples of which can include facial features, iris features, thermal signatures, and the like, including combinations thereof. Furthermore, in one aspect comparing the at least one substantially unique identification trait further includes comparing the at least one substantially unique identification trait against a plurality of known identification traits.

In yet another aspect, the individual representation can be a facial representation, and the facial representation can be analyzed to locate a specific facial feature and the imager device can be panned and/or zoomed to image the specific facial feature or iris feature.

In a further aspect, the method can include moving the emitted infrared electromagnetic radiation and/or the imager device relative to movements of the individual in order to track the individual during receiving of the infrared electromagnetic radiation.

In yet another aspect, the method can further include receiving the electronic representation, selecting a portion of the electronic representation, zooming the imager device to substantially correspond to the portion of the electronic representation and generating a secondary electronic representation of the individual, and processing the secondary electronic representation into a secondary individual representation having at least one substantially unique identification trait.

In a further aspect, an electronic device having an integrated user authorization system is provided, wherein the user authorization system includes an imager device including a semiconductor device layer having a thickness of less than about 10 microns, at least two doped regions forming a junction, and a textured region positioned to interact with the electromagnetic radiation, wherein the imaging device has an external quantum efficiency of at least about 33% for electromagnetic radiation having at least one wavelength of greater than 800 nm. The imager device is positioned to capture an electronic representation of an identification trait of a user of the device, wherein the imager device is operable to at least periodically capture the electronic representation. The system can further include a storage register operable to store a known identification trait of an authorized user, and an analysis module electrically coupled to the imager device and the storage register, the analysis module being operable to compare the electronic representation of the identification trait to the known identification trait to verify that the user is the authorized user. In another aspect, the system can further include a light source operable to emit electromagnetic radiation having at least one wavelength of from about 700 nm to about 1200 nm toward the user. In yet another aspect, the analysis module and the imager device can be integrated monolithically together separate from the CPU of the electronic device. It should be noted that the analysis module can be physically separate from the imager device and operate independently from the CPU of the electronic device. In a further aspect, the imager device can be operable to continuously verify the user is the authorized user. In yet a further aspect, the system can include a switch to toggle the imager device between infrared light capture and visible light capture modes. Various switches are contemplated herein, for example, a transistor, an infrared or color filter and others know by those skilled in the art.

BRIEF DESCRIPTION OF THE DRAWINGS

For a fuller understanding of the nature and advantage of the present invention, reference is being made to the following detailed description of preferred embodiments and in connection with the accompanying drawings, in which:

FIG. 9c is a schematic view of a pixel configuration for a photoimager array in accordance with another aspect of the present disclosure.

DETAILED DESCRIPTION

Figure 1:
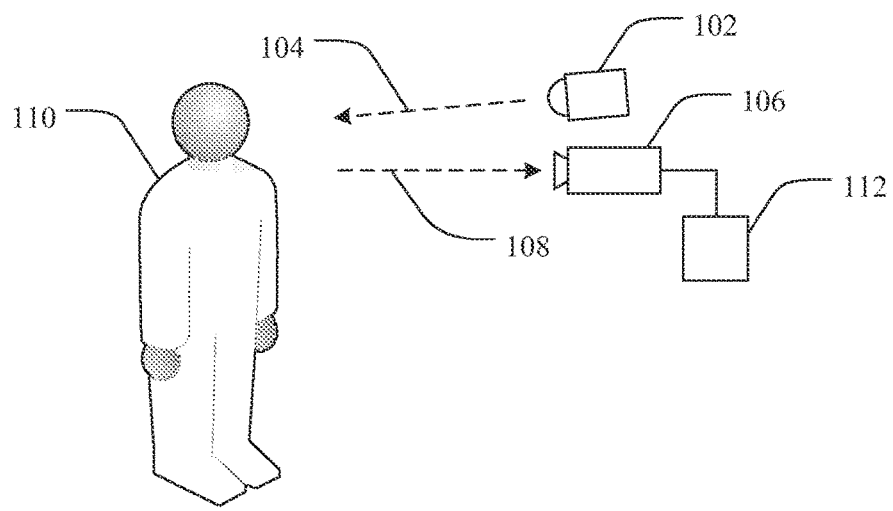
FIG. 1 is a representation of a system for identifying an individual in accordance with one aspect of the present disclosure.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

The following terminology will be used in accordance with the definitions set forth below.

It should be noted that, as used in this specification and the appended claims, the singular forms "a," and, "the" include plural referents unless the context clearly dictates otherwise. Thus, for example, reference to "a dopant" includes one or more of such dopants and reference to "the layer" includes reference to one or more of such layers.

As used herein, "quantum efficiency" (QE) is defined as the percentage of photons incident on an optoelectronic device that are converted into electrons. External QE (EQE) is defined as the current obtained outside of the device per incoming photon. As such, EQE therefore depends on both the absorption of photons and the collection of charges. The EQE is lower than the QE due to recombination effects and optical losses (e.g. transmission and reflection losses).

As used herein, the terms "electromagnetic radiation" and "light" can be used interchangeably, and can represent wavelengths across a broad range, including visible wavelengths (approximately 350 nm to 800 nm) and non-visible wavelengths (longer than about 800 nm or shorter than 350 nm). The infrared spectrum is often described as including a near infrared portion of the spectrum including wavelengths of approximately 800 to 1300 nm, a short wave infrared portion of the spectrum including wavelengths of approximately 1300 nm to 3 micrometers, and a mid to long wave infrared (or thermal infrared) portion of the spectrum including wavelengths greater than about 3 micrometers up to about 30 micrometers. These are generally and collectively referred to herein as "infrared" portions of the electromagnetic spectrum unless otherwise noted.

As used herein, "response time" refers to the rise time or fall time of a detector device. In one aspect, "rise time" is the time difference between the 10% point and the 90% point of the peak amplitude output on the leading edge of the electrical signal generated by the interaction of light with the device. "Fall time" is measured as the time difference between the 90% point and the 10% point of the trailing edge of the electrical signal. In some aspects, fall time can be referred to as the decay time.

As used herein, "shutter speed" refers to the time duration of a camera's shutter remain open while an image is captured. The shutter speed directly proportional to the exposure time, i.e. the duration of light reaching the image sensor. In other words, the shutter speed controls the amount of light that reaches the photosensitive imager. The slower the shutter speed, the longer the exposure time. Shutter speeds are commonly expressed in seconds and fractions of seconds. For example, 4, 2, 1, ½, ¼, ⅛, $\frac{1}{15}$, $\frac{1}{30}$, $\frac{1}{60}$, $\frac{1}{125}$, $\frac{1}{250}$, $\frac{1}{500}$, $\frac{1}{1000}$, $\frac{1}{2000}$, $\frac{1}{4000}$, $\frac{1}{8000}$. Notably, each speed increment halves the amount of light incident upon the imager.

As used herein, the term "textured region" refers to a surface having a topology with nano- to micron-sized surface variations. Such a surface topology can be formed by any appropriate technique, including, without limitation, irradiation of a laser pulse or laser pulses, chemical etching, lithographic patterning, interference of multiple simultaneous laser pulses, reactive ion etching, and the like. While the characteristics of such a surface can be variable depending on the materials and techniques employed, in one aspect such a surface can be several hundred nanometers thick and made up of nanocrystallites (e.g. from about 10 to about 50 nanometers) and nanopores. In another aspect, such a surface can include micron-sized structures (e.g. about 0.5 μm to about 60 μm). In yet another aspect, the surface can include nano-sized and/or micron-sized structures from about 5 nm and about 500 μm. It should be mentioned that the textured region can be ordered or disordered.

As used herein, the terms "surface modifying" and "surface modification" refer to the altering of a surface of a semiconductor material using a variety of surface modification techniques. Non-limiting examples of such techniques include plasma etching, reactive ion etching, porous silicon etching, lasing, chemical etching (e.g. anisotropic etching, isotropic etching), nanoimprinting, material deposition, selective epitaxial growth, and the like, including combinations thereof. In one specific aspect, surface modification can include processes using primarily laser radiation or laser radiation in combination with a dopant, whereby the laser radiation facilitates the incorporation of the dopant into a surface of the semiconductor material. Accordingly, in one aspect surface modification includes doping of a substrate such as a semiconductor material.

As used herein, the term "target region" refers to an area of a substrate that is intended to be doped or surface modified. The target region of the substrate can vary as the surface modifying process progresses. For example, after a first target region is doped or surface modified, a second target region may be selected on the same substrate.

As used herein, the term "fluence" refers to the amount of energy from a single pulse of laser radiation that passes through a unit area. In other words, "fluence" can be described as the energy surface density of one laser pulse.

As used herein, the term "detection" refers to the sensing, absorption, and/or collection of electromagnetic radiation.

As used herein, the term "scene radiance" refers to the areal density of light impinging on a known area or scene.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

The Disclosure

Security has generally become a top priority for many businesses, communities, governments, and the like. One key component in establishing effective security is the rapid identification of individuals. For example, implementation of biometric scanning procedures in major thoroughfares such as airports, major cities, and the like can facilitate the identification and tracking of individuals for the safety of the populace as well as, in some cases, the safety of the individual being identified and tracked. As one example, such a system can be utilized to identify abducted or runaway children. In other cases, fugitives and suspected criminals can be located and apprehended. Also, such systems can be useful for identifying authorized users and allowing access for authorized users for financial transactions, personal electronic devices that can reduce the incidence of voter fraud, financial fraud, other forms of identity theft, and the like.

As has been described, one problem inherent to biometric systems imaging facial and ocular features is interference due to pigmentation. To avoid this potential interference, a biometric imaging device capturing light wavelengths in the range of 800 nm to 1300 nm can be used. For electromagnetic radiation in this wavelength range pigmentation is substantially transparent, and therefore electromagnetic photons pass freely through the pigment and reflect off of structural elements of interest for the identification. In the eye, for example, near infrared electromagnetic photons pass through the iris pigment and reflect off of iris ligament structures.

Conventional imagers, however, including both CCDs and CMOS image sensors, are based on silicon photodetectors and have very low sensitivity to near infrared light in the wavelength range of interest. As such, in many cases these systems are limited to applications where the low sensitivity and image capture speed limitations are not an issue. When attempting to capture an iris signature from a distance and/or with a short integration time, IR light needs to be greatly increased in intensity to compensate for the poor IR sensitivity of traditional imagers. High intensity IR can be damaging to ocular tissue and potentially may cause other negative side effects.

The present disclosure provides an efficient biometric device that can operate in low light conditions with good signal to noise ratio and high quantum efficiencies in the visible and infrared (IR) spectrum. Using an IR light source, as opposed to purely visible light, the present system can image the textured patterns of the iris, remove existing light variations, and reduce pattern interference from corneal reflections, thereby capturing more precise iris information.

In one aspect, as is shown in FIG. 1 for example, a system for identifying an individual can include at least one active light source 102 capable of emitting electromagnetic radiation 104 having at least one wavelength of from about 700 nm to about 1200 nm and an imager device 106 positioned to receive the electromagnetic radiation upon reflection 108 from an individual 110 to generate an electronic representation of the individual. An image processing module 112 can be functionally coupled to the imager device 106 to receive the electronic representation. The image processing module 112 functions to process the electronic representation, using known algorithms to those skilled in the art, into an individual representation having at least one substantially unique identification trait. This substantially unique identification trait is used to identify the individual 110. Additionally, it is noted that such a system can be utilized in cooperative as well as non-cooperative identification situations.

Figure 2:
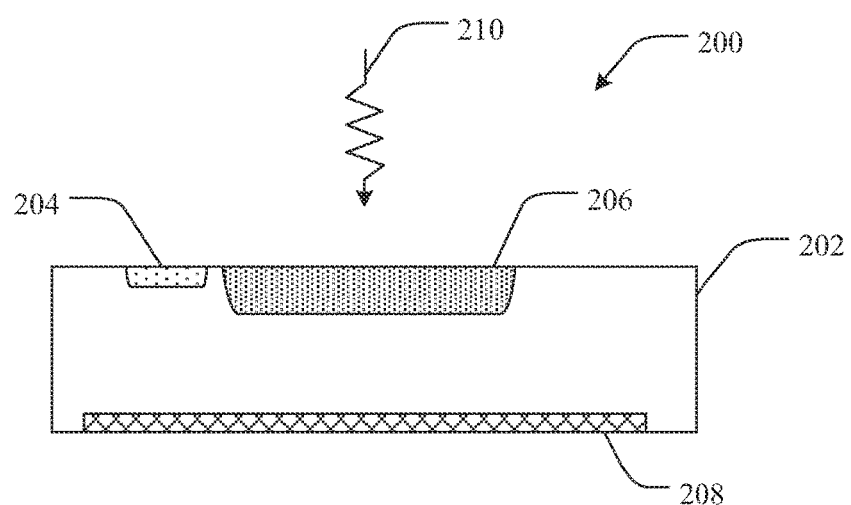
FIG. 2 is a schematic view of an imager device in accordance with another aspect of the present disclosure.

FIG. 2 shows one exemplary embodiment of an imager device that is capable of operation in low light conditions with good signal to noise ratio and high quantum efficiencies in the visible and IR light spectrum. The imager device 200 can include a semiconductor device layer 202 having a device layer with a thickness of less than about 10 microns, at least two doped regions 204, 206 forming a junction, and a textured region 208 positioned to interact with incoming electromagnetic radiation 210. Numerous configurations are contemplated, and any type of junction configuration is considered to be within the present scope. For example, the first and second doped regions can be distinct from one another, contacting one another, overlapping one another, etc. In some cases, an intrinsic region can be located at least partially between the first and second doped regions. In some aspects, the semiconductor device layer can be less than about 50 microns thick. Additionally, in some aspects the semiconductor device layer can be disposed on a bulk semiconductor layer or semiconductor support layer.

The textured region 208 is shown located on a side of the semiconductor device layer 202 that is opposite to the first doped region 204 and the second doped region 206. In this case, electromagnetic radiation that passes through the semiconductor device layer 202 to contact the textured region 208 can be reflected back through the semiconductor device layer, thus effectively increasing the absorption path length of the semiconductor material. The textured region can be associated with an entire surface of the semiconductor material or only a portion thereof. Additionally, in some aspects the textured region can be specifically positioned to maximize the absorption path length of the semiconductor material. In other aspects, a third doping can be included near the textured region to improve the collection of carriers generated near the textured region.

The imager device can have a semiconductor device layer with a thickness of less than about 10 microns and an external quantum efficiency of at least about 33% for electromagnetic radiation having at least one wavelength of greater than 800 nm. In another aspect, the imager device can have a response time of from about 0.1 ms to about 1 ms and an external quantum efficiency of at least about 33% for electromagnetic radiation having at least one wavelength greater than about 800 nm. In another aspect, the response time can be from about 0.1 ms to about 16 ms. Other thicknesses of device layers are additionally contemplated. In one aspect, for example, the device layer thickness can be less than about 50 microns. In another aspect, the device layer thickness can be less than 5 microns. In yet another aspect, the device layer thickness can be less than 1 micron. A lower limit for thickness of the device layer can be any thickness that allows functionality of the device. In one aspect, however, the device layer can be at least 10 nm thick. In another aspect, the device layer can be at least 100 nm thick. In yet another aspect, the device layer can be at least 500 nm thick. Additionally, in another aspect, the imager device can have an external quantum efficiency of at least about 23% for electromagnetic radiation having at least one wavelength greater than about 850 nm. In yet another aspect, the imager device can have an external quantum efficiency of at least about 11% for electromagnetic radiation having at least one wavelength greater than about 940 nm. In another aspect, the imager device can have a response time of from about 0.1 ms to about 1 ms and an external quantum efficiency of at least about 11% for electromagnetic radiation having at least one wavelength greater than about 940 nm.

In yet another aspect, the imager device can have an external quantum efficiency of at least about 46% for electromagnetic radiation having at least one wavelength of greater than 800 nm. In another aspect, the imager device can have a response time of from about 0.1 ms to about 1 ms and an external quantum efficiency of at least about 46% for electromagnetic radiation having at least one wavelength greater than about 800 nm. Additionally, in another aspect, the imager device can have a semiconductor device layer having a thickness of less than 10 microns, and the imager can have an external quantum efficiency of at least about 32% for electromagnetic radiation having at least one wavelength greater than about 850 nm. In still another aspect, the imager device can have a semiconductor device layer having a thickness of less than 10 microns, and the imager can have an external quantum efficiency of at least 50% or at least 60% for electromagnetic radiation having at least one wavelength greater than about 850 nm. In yet another aspect, the imager device can have an external quantum efficiency of at least about 15% for electromagnetic radiation having at least one wavelength greater than about 940 nm. In another aspect, the imager device can have a response time of from about 0.1 ms to about 1 ms and an external quantum efficiency of at least about 15% for electromagnetic radiation having at least one wavelength greater than about 940 nm. Further details regarding such photosensitive devices have been described in U.S. application Ser. No. 13/164,630, filed on Jun. 20, 2011, which is incorporated herein by reference in its entirety.

It should be noted that, while the device shown in FIG. 2 has a frontside illuminated architecture, backside illuminated architectures are also contemplated and are considered to be within the present scope. Additionally, whether frontside illuminated or backside illuminated, the textured region 208 can be positioned on a side of the semiconductor device layer 202 opposite the incoming electromagnetic radiation 210 as shown. The textured region can also be positioned on a side of the semiconductor device layer adjacent the incoming electromagnetic radiation (not shown). In other words, in this case the electromagnetic radiation would contact the textured region prior to passing into the semiconductor device layer. Additionally, it is contemplated that the textured region can be positioned on both an opposite side and an adjacent side of the semiconductor device layer.

The present imaging device can be utilized to capture an electronic representation that is capable of being used to identify an individual at short distances as well as long distances. The device can capture the electronic representation at short distances such as, for example, from about 2 cm or less to about 10 cm, or up to 50 cm, or up to 0.5 m. The device can also capture the electronic representation at from short distances to long distances such as, for example, up to 1 m, up to 3 m, up to 6 m, up to 10 m, or up to 15 m or more.

The semiconductor utilized to construct the imager can be any useful semiconductor material from which such an imager can be made having the properties described herein. In one aspect, however, the semiconductor device layer is silicon. It is noted, however, that silicon photo detectors have limited detectability of IR wavelengths of light, particularly for thin film silicon devices. Traditional silicon materials require substantial absorption depths in order to detect photons having wavelengths longer than about 700 nm. While visible light can be readily absorbed in the first few microns of a silicon layer, absorption of longer wavelengths (e.g. 900 nm) in silicon at a thin wafer depth (e.g. approximately 100 μm) is poor if at all. The present imager devices can increase the electromagnetic radiation absorption range of silicon, thus allowing the absorption of visible and IR light even at shallow depths and in silicon thin films.

Returning to FIG. 2, for example, the textured region 208 can increase the absorption, increase the external quantum efficiency, and decrease response times, particularly in the infrared wavelengths. Such unique and novel devices can allow for fast shutter speeds thereby capturing images of moving objects in the visible and infrared spectrums. Such an increased sensitivity in a silicon-based device can thus reduce processing cost of photodetectors, reduce the power needed in light sources, increase the depth resolution in 3D types imaging, and improve the biometric measurements of an individual.

Figure 3:
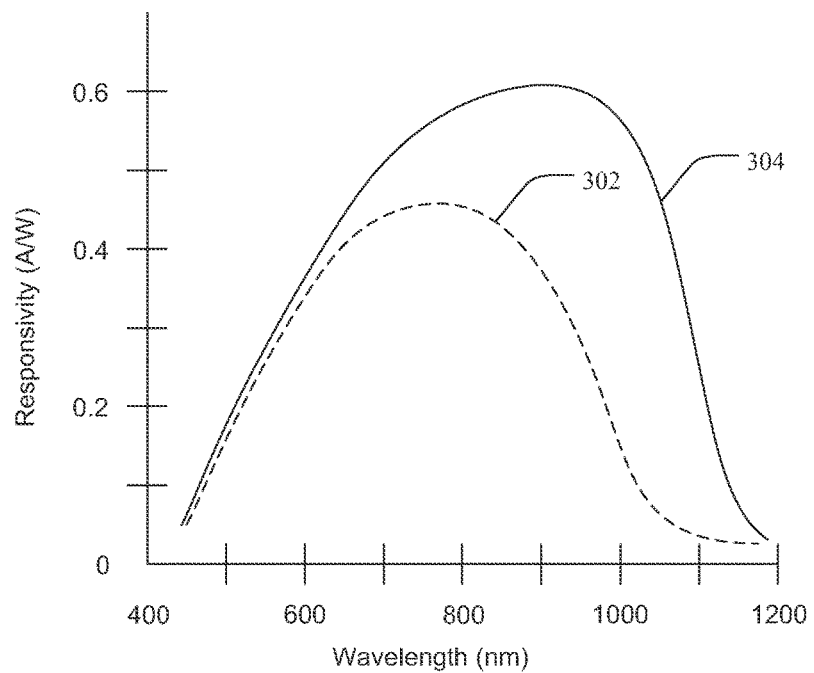
FIG. 3 is a graphical representation of the absorption characteristics of a fast (or thin) photodetector device based on standard silicon compared to the absorption characteristics of a photodetecting device based on silicon but having a textured region in accordance with another aspect of the present disclosure.

FIG. 3 shows an absorption/responsivity graph where the dashed line 302 represents the absorption characteristics of a photodiode based on a traditional standard fast silicon device, and the solid line 304 represents the absorption characteristics of a silicon-based photodiode device but including a textured region. Notably, the absorption of a standard fast silicon imager in the infrared (i.e. the 800 nm to 1200 nm region) results in relatively low responsivity compared to the imager device with the textured region. It is noted that an imager is a collection of multiple photodiodes.

While it is contemplated that the present system can include optics for increasing the capture distance between the device and the individual, the imager device having the textured region allows the system to function at low IR light intensity levels even at such long distances. This reduces energy expenditure and thermal management issues, as well as potentially decreasing side effects that can result from high intensity IR light. In one aspect, for example, the imager device can capture the electronic representation of an individual with sufficient detail to identify a substantially unique identification trait using electromagnetic radiation emitted from the active light source having at least one wavelength of from about 700 nm to about 1200 nm and having a scene radiance impinging on the individual at 3 meters that is at least 0.1 mW/mm$^2$. In another aspect, the imager device can capture the electronic representation of an individual with sufficient detail to identify a substantially unique identification trait using electromagnetic radiation emitted from the active light source having at least one wavelength of from about 800 nm to about 1000 nm and having a scene radiance impinging on the individual at 3 meters that is from about 0.1 mW/mm$^2$ to about 100 mW/mm$^2$. In another aspect the imager device can capture the electronic representation of an individual with sufficient detail to identify a substantially unique identification trait using electromagnetic radiation emitted from the active light source having at least one wavelength of from about 800 nm to about 1000 nm and having a scene radiance impinging on the individual at 3 meters that is from about 1 mW/mm$^2$ to about 10 mW/mm$^2$. In yet another aspect, at distances of greater than 2 meters the electromagnetic radiation having a wavelength of at least 940 nm and should have optical power below the eye damage threshold of 10,000 mW/mm$^2$/steradian. It should be noted that in one aspect the substantially unique identification trait is an iris pattern of the individual.

As has been described, in some aspects the thickness of the silicon material in the device can dictate the responsivity and response time. Standard silicon devices need to be thick, i.e. greater than 100 μm in order to detect wavelengths in the infrared spectrum, and such detection with thick devices results in a slow response and high dark current. The textured region is positioned to interact with electromagnetic radiation to increase the absorption of infrared light in a device, thereby improving the infrared responsivity while allowing for fast operation. Diffuse scattering and reflection can result in increased path lengths for absorption, particularly if combined with total internal reflection, resulting in large improvements of responsivity in the infrared for silicon photodiodes, photodetectors, photodiode arrays, imagers, and the like. Because of the increased path lengths for absorption, thinner silicon materials can be used to absorb electromagnetic radiation up into the infrared regions. One advantage of thinner silicon material devices is that charge carriers are more quickly swept from the device, thus decreasing the response time. Conversely, thick silicon material devices sweep charge carriers therefrom more slowly, at least in part due to diffusion.

It is noted, however, that the silicon device layer can be of any thickness that allows electromagnetic radiation detection and conversion functionality, and thus any such thickness of silicon device layer is considered to be within the present scope. With that being said, thin silicon layer materials can be particularly beneficial in decreasing the response time and/or the capacitance of the device. As has been described, charge carriers can be more quickly swept from thinner silicon material layers as compared to thicker silicon material layers. The thinner the silicon, the less material the electron/holes have to traverse in order to be collected, and the lower the probability of a generated charge carrier encountering a defect that could trap or slow the collection of the carrier. Thus one objective to implementing a fast photo response is to utilize a thin silicon material for the semiconductor device layer of the imager. Such a device can be nearly depleted of charge carriers by the built in potential of the photodiode and any applied bias to provide for a fast collection of the photo generated carriers by drift in an electric field. Charge carriers remaining in any undepleted region of the photodiode are collected by diffusion transport, which is slower than drift transport. For this reason, it can be desirable to have the thickness of any region where diffusion may dominate to be much thinner than the depleted drift regions. In silicon materials having the proper doping provides a depletion region of about 10 μm with no applied bias. As such, in some aspects it can be useful to utilize a silicon material layer having a thickness of less than about 100 μm, less than about 10 μm or less than about 5 μm. In another aspect, the silicon material can have a thickness and substrate doping concentration such that an applied bias generates an electrical field sufficient for saturation velocity of the charge carriers. It should be noted that operating a photodiode, as disclosed herein, at a zero bias can result in low noise but at a longer response time. When bias is applied however, the dark current is increased, resulting in higher noise, but with a decreased response time. The increased dark current can be compensated if the incident radiation signal is strong. The amount of dark current increase can be minimized, however, with a thinner device layer.

The semiconductor device layer in general can be of any thickness that allows electromagnetic radiation detection and conversion functionality, and thus any such thickness of semiconductor material is considered to be within the present scope. In some aspects, the textured region increases the efficiency of the device such that the semiconductor device layer can be thinner than has previously been possible. Decreasing the thickness of the semiconductor device layer reduces the amount of semiconductor material required to make such a device. In one aspect, for example, the semiconductor device layer has a thickness of from about 500 nm to about 50 μm. In another aspect, the semiconductor device layer has a thickness of less than or equal to about 100 μm. In yet another aspect, the semiconductor device layer has a thickness of from about 500 nm to about 20 μm. In another aspect, the semiconductor device layer has a thickness of from about 500 nm to about 10 μm. In a further aspect, the semiconductor device layer can have a thickness of from about 500 nm to about 50 μm. In yet a further aspect, the semiconductor device layer can have a thickness of from about 500 nm to about 2 μm. In other aspect the semiconductor device layer can have a thickness of less than 10 microns, 5 microns, or 1 microns.

In one aspect a silicon semiconductor device layer has a thickness of from about 100 nm to about 100 μm. In another aspect, the silicon material has a thickness of from about 0.5 μm to about 50 μm. In yet another aspect, the silicon material has a thickness of from about 5 μm to about 10 μm. In a further aspect, the silicon material has a thickness of from about 1 μm to about 5 μm.

As has been described, the response time of a photosensitive imaging device is limited by the transit time of the photo generated carriers across the thickness of the device layer. As further explanation, the RC time constant of the load resistance, (R) and the capacitance (C) of the entire electronic device structure can be kept less than this transit time by using small load resistors and keeping the capacitance of the photodiodes small by limiting the doping density of the silicon material and area of the photodiodes. For example, photodiodes doped at $10^{15}/cm^3$ can have a capacitance that may be 10 $nF/cm^2$ without any applied bias. Small area photodiodes with 50 ohm load resistors can have very fast RC time constants. A photodiode with an area of 0.01 $cm^2$ can have a RC time constant of 0.5 nanoseconds. Given that the response time will be limited by the maximum charge carrier transit time across the photodiode, then diffusion rates can place an upper limit on the response time for photodiodes of different thickness. For example, if the photodiodes have a thickness of less than d=100 μm, then the diffusion transit time can be calculated by Equation (II) below, where D is the diffusion coefficient for electrons.

$$\frac{d^2}{2D} \qquad (II)$$

The response time is bound by an upper limit of 2 μs. For light having a wavelength of about 900 nm, only about 35% is absorbed in the first pass or a device thinner than 100 μm and approximately 30% is reflected at the first surface, thereby giving a responsivity on the order 10% or 0.1 A/W. The responsivity, R, can be increased at least five fold by using multiple internal reflections to achieve a value of R=0.5 A/W.

Thus, the devices of the present disclosure increase the absorption path length of silicon materials by increasing the absorption path length for longer wavelengths as compared to traditional silicon devices. The absorption depth in silicon photodetectors is the depth into silicon at which the radiation intensity is reduced to about 36% of the value at the surface of the silicon material. The increased absorption path length results in an apparent reduction in the absorption depth, or a reduced apparent or effective absorption depth. For example, the effective absorption depth of silicon can be reduced such that longer wavelengths can be absorbed at depths of less than or equal to about 100 μm. By increasing the absorption path length, such devices are able to absorb longer wavelengths (e.g. >1000 nm for silicon) within a thin semiconductor material. In addition to decreasing the effective absorption depth, the response time can be decreased using thinner semiconductor materials.

In one aspect, a photodiode can have a thickness of less than about d=10 μm. Using equation (I) above, the resultant upper response time limit is about 20 ns. For light having a wavelength of about 700 nm with about 33% absorbed in the first pass and about 30% being reflected at the first surface, the responsivity can be on the order 10% or 0.3 Ampere/Watt. The responsivity, R, can be increased at least two fold by using multiple internal reflections as described herein to achieve a value of R=0.6 A/W.

In one aspect, for example, an imager device has a response time of from about 0.1 ms to about 1 ms. In another aspect, an imager device has a responsivity of from about 0.4 A/W to about 0.55 A/W for at least one wavelength of from about 800 nm to about 1200 nm relative to standard silicon. In yet another aspect, an imager device has a responsivity of from about 0.1 A/W to about 0.55 A/W for at least one wavelength of from about 1000 nm to about 1200 nm relative to standard silicon. In another aspect, the optoelectronic device has an increased external quantum efficiency of at least 10% for at least one wavelength of from about 550 nm to about 1200 nm relative to a silicon device with comparable thickness and response time.

As has been described, photosensitive imaging devices according to aspects of the present disclosure can exhibit lower levels of dark current as compared to traditional devices. Although a variety of reasons are possible, one exemplary reason may be that a thinner silicon material layer can have fewer crystalline defects responsible for the generation of dark current. In one aspect, for example, the dark current of an photosensing imaging device during operation is from about 100 $pA/cm^2$ to about 10 $nA/cm^2$. In another aspect, the maximum dark current of an imaging device during operation is less than about 1 $nA/cm^2$.

Accordingly, imager devices according to aspects of the present disclosure provide, among other things, enhanced response in the infrared light portion of the optical spectrum and improved response and quantum efficiency in converting electromagnetic radiation to electrical signals. As such, high quantum efficiencies and increase response times can be obtained in the infrared for devices thinner than about 100 μm. In other words, the sensitivity and response are higher than that found in thicker devices at infrared wavelengths.

In addition to silicon, other semiconductor materials are contemplated for use in the imager devices of the present disclosure. Non-limiting examples of such semiconductor materials can include group IV materials, compounds and alloys comprised of materials from groups II and VI, compounds and alloys comprised of materials from groups III and V, and combinations thereof. More specifically, exemplary group IV materials can include silicon, carbon (e.g. diamond), germanium, and combinations thereof. Various exemplary combinations of group IV materials can include silicon carbide (SiC) and silicon germanium (SiGe). Exemplary silicon materials, for example, can include amorphous silicon (a-Si), microcrystalline silicon, multicrystalline silicon, and monocrystalline silicon, as well as other crystal types. In another aspect, the semiconductor material can include at least one of silicon, carbon, germanium, aluminum nitride, gallium nitride, indium gallium arsenide, aluminum gallium arsenide, and combinations thereof.

Exemplary combinations of group II-VI materials can include cadmium selenide (CdSe), cadmium sulfide (CdS), cadmium telluride (CdTe), zinc oxide (ZnO), zinc selenide (ZnSe), zinc sulfide (ZnS), zinc telluride (ZnTe), cadmium zinc telluride (CdZnTe, CZT), mercury cadmium telluride (HgCdTe), mercury zinc telluride (HgZnTe), mercury zinc selenide (HgZnSe), and combinations thereof.

Exemplary combinations of group III-V materials can include aluminum antimonide (AlSb), aluminum arsenide (AlAs), aluminum nitride (AlN), aluminum phosphide (AlP), boron nitride (BN), boron phosphide (BP), boron arsenide (BAs), gallium antimonide (GaSb), gallium arsenide (GaAs), gallium nitride (GaN), gallium phosphide (GaP), indium antimonide (InSb), indium arsenide (InAs), indium nitride (InN), indium phosphide (InP), aluminum gallium arsenide (AlGaAs, $Al_xGa_{1-x}As$), indium gallium arsenide (InGaAs, $In_xGa_{1-x}As$), indium gallium phosphide (InGaP), aluminum indium arsenide (AlInAs), aluminum indium antimonide (AlInSb), gallium arsenide nitride (GaAsN), gallium arsenide phosphide (GaAsP), aluminum gallium nitride (AlGaN), aluminum gallium phosphide (AlGaP), indium gallium nitride (InGaN), indium arsenide antimonide (InAsSb), indium gallium antimonide (InGaSb), aluminum gallium indium phosphide (AlGaInP), aluminum gallium arsenide phosphide (AlGaAsP), indium gallium arsenide phosphide (InGaAsP), aluminum indium arsenide phosphide (AlInAsP), aluminum gallium arsenide nitride (AlGaAsN), indium gallium arsenide nitride (InGaAsN), indium aluminum arsenide nitride (InAlAsN), gallium arsenide antimonide nitride (GaAsSbN), gallium indium nitride arsenide antimonide (GaInNAsSb), gallium indium arsenide antimonide phosphide (GaInAsSbP), and combinations thereof.

Additionally, various types of semiconductor materials are contemplated, and any such material that can be incorporated into an electromagnetic radiation detection device is considered to be within the present scope. In one aspect, for example, the semiconductor material is monocrystalline. In another aspect, the semiconductor material is multicrystalline. In yet another aspect, the semiconductor material is microcrystalline. It is also contemplated that the semiconductor material can be amorphous. Specific nonlimiting examples include amorphous silicon or amorphous selenium.

The semiconductor materials of the present disclosure can also be made using a variety of manufacturing processes. In some cases the manufacturing procedures can affect the efficiency of the device, and may be taken into account in achieving a desired result. Exemplary manufacturing processes can include Czochralski (Cz) processes, magnetic Czochralski (mCz) processes, Float Zone (FZ) processes, epitaxial growth or deposition processes, and the like. It is contemplated that the semiconductor materials used in the present invention can be a combination of monocrystalline material with epitaxially grown layers formed thereon.

A variety of dopant materials are contemplated for the formation of the multiple doped regions, the textured region, or any other doped portion of the imager device, and any such dopant that can be used in such processes is considered to be within the present scope. It should be noted that the particular dopant utilized can vary depending on the material being doped, as well as the intended use of the resulting material.

A dopant can be either electron donating or hole donating. In one aspect, non-limiting examples of dopants can include S, F, B, P, N, As, Se, Te, Ge, Ar, Ga, In, Sb, and combinations thereof. It should be noted that the scope of dopants should include, not only the dopants themselves, but also materials in forms that deliver such dopants (i.e. dopant carriers). For example, S dopants includes not only S, but also any material capable being used to dope S into the target region, such as, for example, $H_2S$, $SF_6$, $SO_2$, and the like, including combinations thereof. In one specific aspect, the dopant can be S. Sulfur can be present at an ion dosage level of between about $5 \times 10^{14}$ and about $1 \times 10^{16}$ $ions/cm^2$. Non-limiting examples of fluorine-containing compounds can include $ClF_3$, $PF_5$, $F_2$ $SF_6$, $BF_3$, $GeF_4$, $WF_6$, $SiF_4$, HF, $CF_4$, $CHF_3$, $CH_2F_2$, $CH_3F$, $C_2F_6$, $C_2HF_5$, $C_3F_8$, $C_4F_8$, $NF_3$, and the like, including combinations thereof. Non-limiting examples of boron-containing compounds can include $B(CH_3)_3$, $BF_3$, $BCl_3$, BN, $C_2B_{10}H_{12}$, borosilica, $B_2H_6$, and the like, including combinations thereof. Non-limiting examples of phosphorous-containing compounds can include $PF_5$, $PH_3$, and the like, including combinations thereof. Non-limiting examples of chlorine-containing compounds can include $Cl_2$, $SiH_2Cl_2$, HCl, $SiCl_4$, and the like, including combinations thereof. Dopants can also include arsenic-containing compounds such as $AsH_3$ and the like, as well as antimony-containing compounds. Additionally, dopant materials can include mixtures or combinations across dopant groups, i.e. a sulfur-containing compound mixed with a chlorine-containing compound. In one aspect, the dopant material can have a density that is greater than air. In one specific aspect, the dopant material can include Se, $H_2S$, $SF_6$, or mixtures thereof. In yet another specific aspect, the dopant can be $SF_6$ and can have a predetermined concentration range of about $5.0 \times 10^{-8}$ mol/cm$^3$ to about $5.0 \times 10^{-4}$ mol/cm$^3$. $SF_6$ gas is a good carrier for the incorporation of sulfur into the semiconductor material via a laser process without significant adverse effects on the silicon material. Additionally, it is noted that dopants can also be liquid solutions of n-type or p-type dopant materials dissolved in a solution such as water, alcohol, or an acid or basic solution. Dopants can also be solid materials applied as a powder or as a suspension dried onto the wafer.

Accordingly, the first doped region and the second doped region can be doped with an electron donating or hole donating species to cause the regions to become more positive or negative in polarity as compared to each other and/or the semiconductor device layer. In one aspect, for example, either doped region can be p-doped. In another aspect, either doped region can be n-doped. In one aspect, for example, the first doped region can be negative in polarity and the second doped region can be positive in polarity by doping with p+ and n− dopants. In some aspects, variations of n(−−), n(−), n(+), n(++), p(−−), p(−), p(+), or p(++) type doping of the regions can be used. Additionally, in some aspects the semiconductor material can be doped in addition to the first and second doped regions. The semiconductor material can be doped to have a doping polarity that is different from one or more of the first and second doped regions, or the semiconductor material can be doped to have a doping polarity that is the same as one or more of the first and second doped regions. In one specific aspect, the semiconductor material can be doped to be p-type and one or more of the first and second doped regions can be n-type. In another specific aspect, the semiconductor material can be doped to be n-type and one or more of the first and second doped regions can be p-type. In one aspect, at least one of the first or second doped regions has a surface area of from about 0.1 µm$^2$ to about 32 µm$^2$.

As has been described, the textured region can function to diffuse electromagnetic radiation, to redirect electromagnetic radiation, and to absorb electromagnetic radiation, thus increasing the QE of the device. The textured region can include surface features to increase the effective absorption length of the silicon material. The surface features can be cones, pyramids, pillars, protrusions, micro lenses, quantum dots, inverted features and the like. Factors such as manipulating the feature sizes, dimensions, material type, dopant profiles, texture location, etc. can allow the diffusing region to be tunable for a specific wavelength. In one aspect, tuning the device can allow specific wavelengths or ranges of wavelengths to be absorbed. In another aspect, tuning the device can allow specific wavelengths or ranges of wavelengths to be reduced or eliminated via filtering.

As has been described, a textured region according to aspects of the present disclosure can allow a silicon material to experience multiple passes of incident electromagnetic radiation within the device, particularly at longer wavelengths (i.e. infrared). Such internal reflection increases the effective absorption length to be greater than the thickness of the semiconductor device layer. This increase in absorption length increases the quantum efficiency of the device, leading to an improved signal to noise ratio. The textured region can be associated with the surface nearest the impinging electromagnetic radiation, or the textured region can be associated with a surface opposite in relation to impinging electromagnetic radiation, thereby allowing the radiation to pass through the silicon material before it hits the textured region. Additionally, the textured region can be doped. In one aspect, the textured region can be doped to the same or similar doping polarity as the silicon device layer so as to provide a doped contact region on the backside of the device.

The textured region can be formed by various techniques, including lasing, chemical etching (e.g. anisotropic etching, isotropic etching), nanoimprinting, additional material deposition, reactive ion etching, and the like. One effective method of producing a textured region is through laser processing. Such laser processing allows discrete locations of the semiconductor device layer to be textured. A variety of techniques of laser processing to form a textured region are contemplated, and any technique capable of forming such a region should be considered to be within the present scope. Laser treatment or processing can allow, among other things, enhanced absorption properties and thus increased electromagnetic radiation focusing and detection.

In one aspect, for example, a target region of the silicon material can be irradiated with laser radiation to form a textured region. Examples of such processing have been described in further detail in U.S. Pat. Nos. 7,057,256, 7,354,792 and 7,442,629, which are incorporated herein by reference in their entireties. Briefly, a surface of a semiconductor material such as silicon is irradiated with laser radiation to form a textured or surface modified region. Such laser processing can occur with or without a dopant material. In those aspects whereby a dopant is used, the laser can be directed through a dopant carrier and onto the silicon surface. In this way, dopant from the dopant carrier is introduced into a target region of the silicon material. Such a region incorporated into a silicon material can have various benefits in accordance with aspects of the present disclosure. For example, the target region typically has a textured surface that increases the surface area of the laser treated region and increases the probability of radiation absorption via the mechanisms described herein. In one aspect, such a target region is a substantially textured surface including micron-sized and/or nano-sized surface features that have been generated by the laser texturing. In another aspect, irradiating the surface of the silicon material includes exposing the laser radiation to a dopant such that irradiation incorporates the dopant into the semiconductor. Various dopant materials are known in the art, and are discussed in more detail herein. It is also understood that in some aspects such laser processing can occur in an environment that does not substantially dope the silicon material (e.g. an argon atmosphere).

Thus the surface of the silicon material that forms the textured region is chemically and/or structurally altered by the laser treatment, which may, in some aspects, result in the formation of surface features appearing as nanostructures, microstructures, and/or patterned areas on the surface and, if a dopant is used, the incorporation of such dopants into the semiconductor material. In some aspects, such features can be on the order of 50 nm to 20 µm in size and can assist in the absorption of electromagnetic radiation. In other words, the textured surface can increase the probability of incident radiation being absorbed by the silicon material.

In another aspect, at least a portion of the textured region and/or the semiconductor material can be doped with a dopant to generate a back surface field. A back surface field can function to repel generated charge carriers from the backside of the device and toward the junction to improve collection efficiency and speed. The addition of a back surface field can increase charge carrier collection and depletion. The presence of a back surface field also acts to suppress dark current contribution from the surface of a device.

While the imager device can operate in the absence of a bias at high speeds, in one aspect a reverse bias can be applied across the electrical contacts associated with the imager. Such a reverse bias can function to decrease the response time of the device by more quickly sweeping charge carriers from the silicon material. Accordingly, for those situations whereby a bias is used, any bias voltage capable of sweeping charge carriers from the silicon material is considered to be within the present scope. In one aspect, for example, the reverse bias is from about 0.001 V to about 20 V. In another aspect, the reverse bias is from about 0.001 V to about 10 V. In yet another aspect, the reverse bias is from about 0.001 V to about 5 V. In a further aspect, the reverse bias is from about 0.001 V to about 3 V. In yet a further aspect, the reverse bias is from about 3 V to about 5 V. In some aspects, the reverse bias can be absent, or in other words, 0 V is applied across the first and second contacts. In such cases, the charge carriers can be depleted from the silicon material by the junction potential created by the first and second doped regions.

Figure 4:
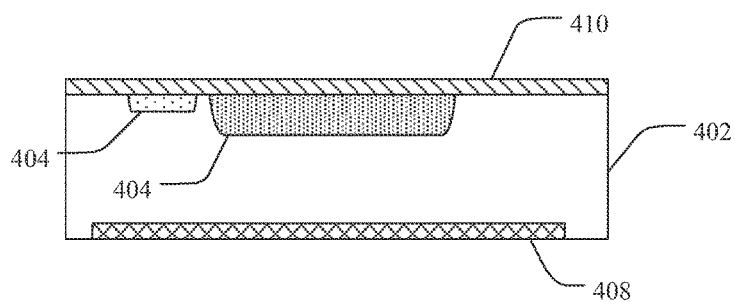
FIG. 4 is a schematic view of a photosensitive device in accordance with another aspect of the present disclosure.

In another aspect, as is shown in FIG. 4, a semiconductor device layer 402 can have a first doped region 404, a second doped region 406, and a textured region 408 on an opposing surface to the doped regions. An antireflective layer 410 can be coupled to the semiconductor device layer 402 on the opposite surface as the textured layer 408. In some aspects, the antireflective layer 410 can be on the same side of the semiconductor device layer 402 as the textured region (not shown). Furthermore, in some aspects a lens can be optically coupled to the semiconductor device layer and positioned to focus incident electromagnetic radiation into the semiconductor device layer.

In another aspect of the present disclosure, a photodiode array is provided as the imager device. Such an array can include a semiconductor device layer having an incident light surface, at least two photodiodes in the semiconductor device layer, where each photodiode includes a first doped region and a second doped region forming a junction, and a textured region coupled to the semiconductor device layer and positioned to interact with electromagnetic radiation. The textured region can be a single textured region or multiple textured regions. Additionally, the photodiode array has a response time of from about 0.1 ms to about 1 ms and an external quantum efficiency of at least 33% for electromagnetic radiation having at least one wavelength greater than about 800 nm. The photodiode array can have a pixel count, or also commonly known as the pixel resolution equal to or greater than about 320×280. In another embodiment the pixel resolution is greater than 1 MP (megapixel), greater than 5 MP, greater than 15 MP and even greater than 25 MP.

Figure 5:
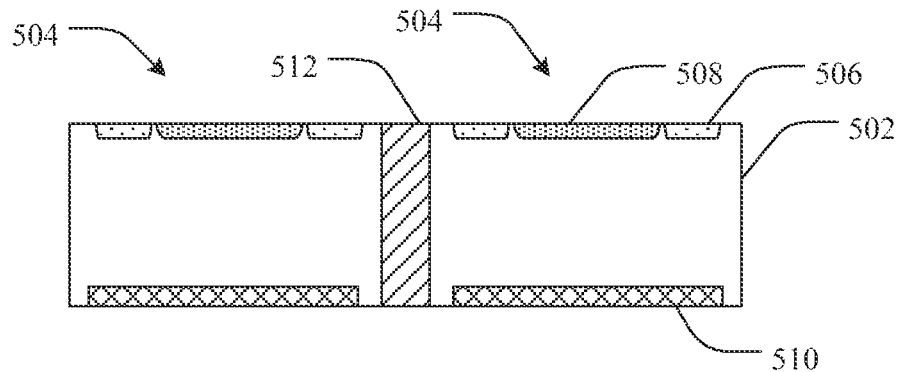
FIG. 5 is a schematic view of a photosensitive array device in accordance with another aspect of the present disclosure.

As is shown in FIG. 5, for example, a semiconductor device layer 502 can include at least two photodiodes 504 each having a first doped region 506 and a second doped region 508. A textured region 510 can be positioned to interact with electromagnetic radiation. FIG. 5 shows a separate textured region for each photodiode. In some aspects, however, a single textured region can be used to increase the absorption path lengths of multiple photodiodes in the array. Furthermore, an isolation structure 512 can be positioned between the photodiodes to electrically and/or optically isolate the photodiodes from one another. In another aspect, the photodiode array can be electronically coupled to electronic circuitry to process the signals generated by each photodiode.

Various imager configurations and components are contemplated, and any such should be considered to be within the present scope. Non-limiting examples of such components can include a carrier wafer, electrical contacts, an antireflective layer, a dielectric layer, circuitry layer, a via(s), a transfer gate, an infrared filter, a color filter array (CFA), an infrared cut filter, an isolation feature, and the like. Additionally, such devices can have light absorbing properties and elements as has been disclosed in U.S. patent application Ser. No. 12/885,158, filed on Sep. 17, 2010 which is incorporated by reference in its entirety. It is further understood that the imager can be a CMOS (Complementary Metal Oxide Semiconductor) imaging sensor or a CCD (Charge Coupled Device).

Figure 6:
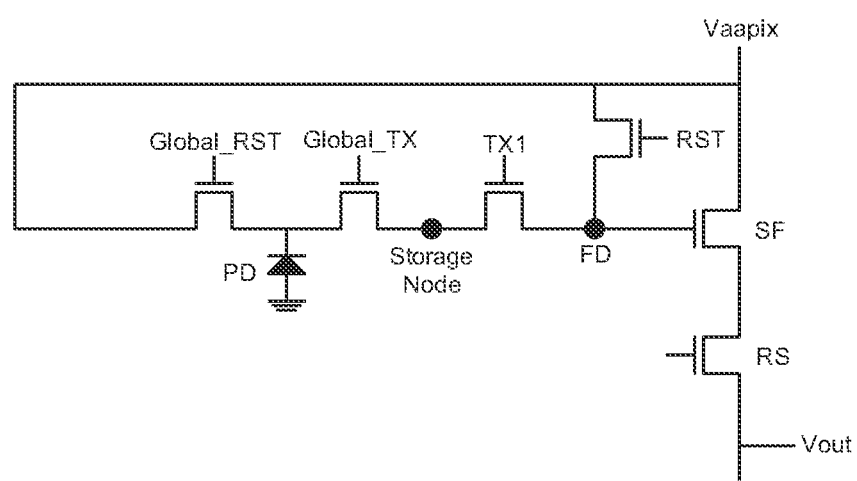
FIG. 6 is a schematic diagram of a six transistor imager in accordance with another aspect of the present disclosure.

Imager device can include a number of transistors per pixel depending on the desired design of the device. In one aspect, for example, an imager device can include at least three transistors. In other aspects, an imaging device can have four, five, or six or more transistors. For example, FIG. 6 shows an exemplary schematic for a six-transistor (6-T) architecture that will allow global shutter operation according to one aspect of the present disclosure. The imager can include a photodiode (PD), a global reset (Global_RST), a global transfer gate (Global_TX), a storage node, a transfer gate (TX1), reset (RST), source follower (SF), floating diffusion (FD), row select transistor (RS), power supply (Vaapix) and voltage out (Vout). Due to the use of extra transfer gate and storage node, correlated-double-sampling (CDS) is allowed. Therefore, the read noise should be able to match typical CMOS 4T pixels.

Figure 7A:
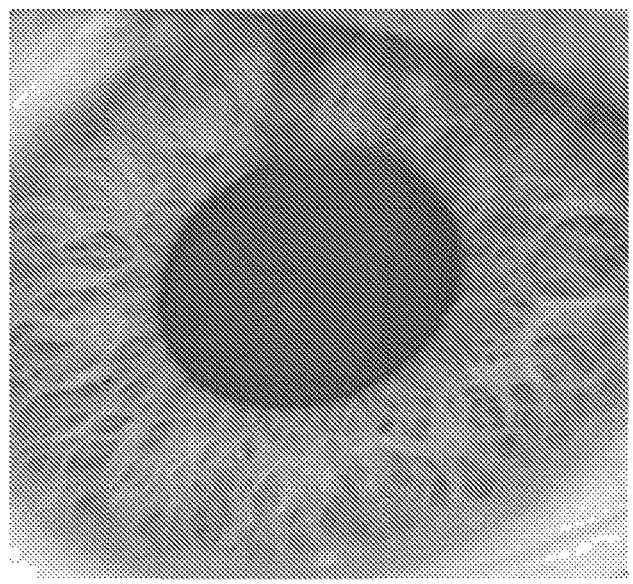
FIG. 7a is a photograph showing an iris captured with an photoimager having a rolling shutter in accordance with another aspect of the present disclosure.
Figure 7B:
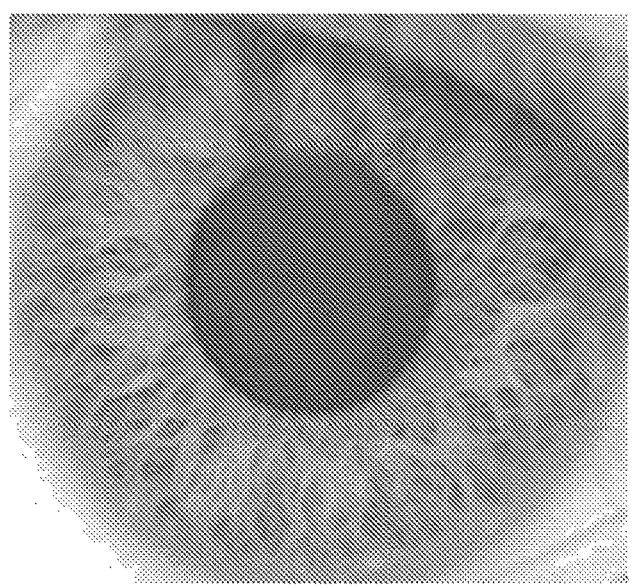
FIG. 7b is a photograph showing an iris captured with an photoimager having a global shutter in accordance with another aspect of the present disclosure.

While a rolling shutter is considered to be within the present scope, the use of a global shutter can be beneficial for use in the present devices and systems. For example, FIGS. 7a-b show images of the iris of a subject captured by an IR sensitive imager device. As can be seen in FIG. 7a, an image of an iris captured using a rolling shutter is somewhat distorted due to movements during capture. These distortions may affect identification of the individual. FIG. 7b, on the other hand, shows an image of an iris captured using a global shutter that is a more defined and does not show such distortion. The global shutter operates by electronically activating all pixels at precisely the same time, allowing them to integrate the light from the scene at the same time and then stop the integration at the same time. This eliminates rolling shutter distortion. The global shutter image was taken under the same conditions as the rolling shutter. Thus, it would be advantages to utilize a global shutter with the photoimaging device to obtain undistorted images, particularly if the subject is in motion.

In another aspect of the present disclosure, the biometric system can include a three dimensional (3D) photosensing imager. Such a 3D-type imager can be useful to image surface details of an individual for identification, such as facial features, body features, stride or body position features, and the like. Time-of-flight (TOF) is one technique developed for use in radar and LIDAR (Light Detection and Ranging) systems to provide depth information that can be utilized for such 3D imaging. The basic principle of TOF involves sending a signal to an object and measuring a property of the returned signal from a target. The measured property is used to determine the TOF. Distance to the target is therefore derived by multiplication of half the TOF and the velocity of the signal.

Figure 8:
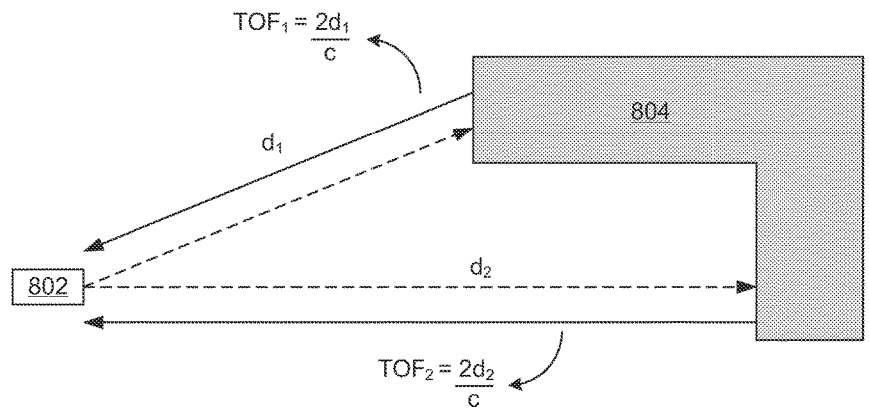
FIG. 8 is an illustration of a time of flight measurement in accordance with another aspect of the present disclosure.

FIG. 8 illustrates a TOF measurement with a target having multiple surfaces that are separated spatially. Equation (III) can be used to measure the distance to a target where d is the distance to the target and c is the speed of light.

$$d = \frac{TOF * c}{2} \quad \text{(III)}$$

By measuring the time (e.g. TOF) it takes for light emitted from a light source 802 to travel to and from a target 804, the distance between the light source (e.g. a light emitting diode (LED)) and the surface of the target can be derived. For such an imager, if each pixel can perform the above TOF measurement, a 3D image of the target can be obtained. The distance measurements become difficult with TOF methods when the target is relatively near the source due to the high speed of light. In one aspect, therefore, a TOF measurement can utilize a modulated LED light pulse and measure the phase delay between emitted light and received light. Based on the phase delay and the LED pulse width, the TOF can be derived. As such, the TOF concept can be utilized in both CMOS and CCD sensors to obtain depth information from each pixel in order to capture an image used for identification of an individual.

Figure 9A:
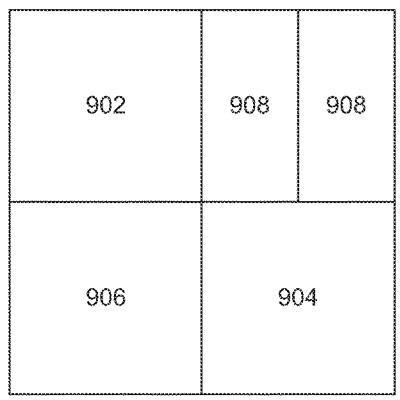
FIG. 9a is a schematic view of a pixel configuration for a photoimager array in accordance with another aspect of the present disclosure.
Figure 9B:
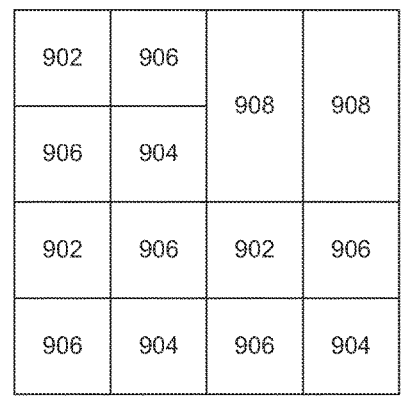
FIG. 9b is a schematic view of a pixel configuration for a photoimager array in accordance with another aspect of the present disclosure.

As one example, a 3D pixel, such as a TOF 3D pixel with enhanced infrared response can improve depth accuracy, which in turn can show facial features in a three dimensional scale. In one aspect, a photoimager array can include at least one 3D infrared detecting pixel and at least one visible light detecting pixel arranged monolithically in relation to each other. FIGS. 9a-c show some non-limiting example configurations of pixel arrangements of such arrays. FIG. 9a shows one example of a pixel array arrangement having a red pixel 902, a blue pixel 904, and a green pixel 906. Additionally, two 3D TOF pixels 908 having enhanced responsivity or detectability in the IR regions of the light spectrum are included. The combination of two 3D pixels allows for better depth perception. In FIG. 9b, the pixel arrangement shown includes an imager as described in FIG. 9a and three arrays of a red pixel, a blue pixel, and two green pixels. Essentially, one TOF pixel replaces one quadrant of a RGGB pixel design. In this configuration, the addition of several green pixels allows for the capture of more green wavelengths that is needed for green color sensitivity need for the human eye, while at the same time capturing the infrared light for depth perception. It should be noted that the present scope should not be limited by the number or arrangements of pixel arrays, and that any number and/or arrangement is included in the present scope. FIG. 9c shows another arrangement of pixels according to yet another aspect.

In some aspects, the TOF pixel can have an on-pixel optical narrow band pass filter. The narrow band pass filter design can match the modulated light source (either LED or laser) emission spectrum and may significantly reduce unwanted ambient light that can further increase the signal to noise ratio of modulated IR light. Another benefit of increased infrared QE is the possibility of high frame rate operation for high speed 3D image capture. An integrated IR cut filter can allow a high quality visible image with high fidelity color rendering. Integrating an infrared cut filter onto the sensor chip can also reduce the total system cost of a camera module (due to the removal of typical IR filter glass) and reduce module profile (good for mobile applications). This can be utilized with TOF pixels and non-TOF pixels.

Figure 10:
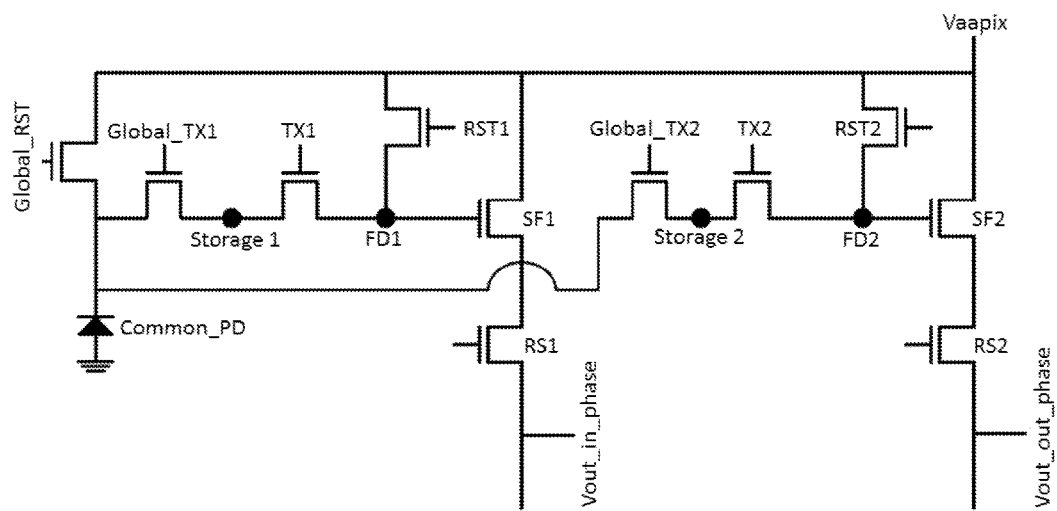
FIG. 10 is a schematic diagram of an eleven transistor imager in accordance with another aspect of the present disclosure.

FIG. 10 shows an exemplary schematic of a 3D TOF pixel according to one aspect of the present disclosure. The 3D TOF pixel can have 11 transistors for accomplishing the depth measurement of the target. In this embodiment, the 3D pixel can include a photodiode (PD), a global reset (Global_RST), a first global transfer gate (Global_TX1), a first storage node, a first transfer gate (TX1), a first reset (RST1), a first source follower (SF1), a first floating diffusion (FD1), a first row select transistor (RS1), a second global transfer gate (Global_TX2), a second storage node, a second transfer gate (TX2), a second reset (RST2), a second source follower (SF2), a second floating diffusion (FD2), a second row select transistor (RS2), power supply (Vaapix) and voltage out (Vout). Other transistors can be included in the 3D architecture and should be considered within the scope of the present invention. The specific embodiment with 11 transistors can reduce motion artifacts due to the global shutter operation, thereby giving more accurate measurements.

Figure 11:
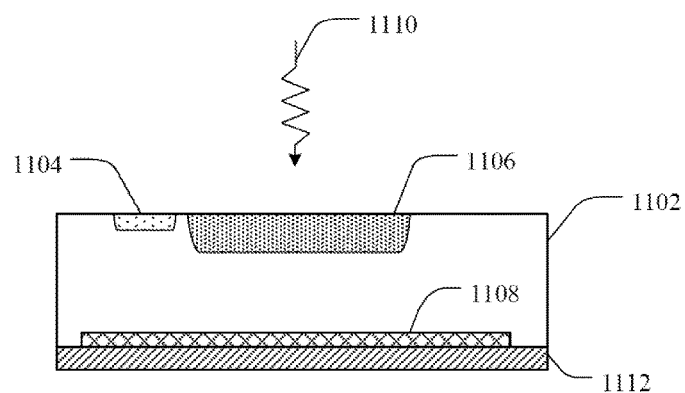
FIG. 11 is a schematic view of a photosensitive device comprising a bolometer in accordance with another aspect of the present disclosure.

In another aspect, thermal imaging can be utilized for identification of an individual or a group of individuals exhibiting thermal-related characteristics. As is shown in FIG. 11 for example, such an imager can include a silicon device layer 1102 having a first doped region 1104 and a second doped region 1106 forming at least one junction. Numerous configurations are contemplated, and any type of junction configuration is considered to be within the present scope. For example, the first and second doped regions can be distinct from one another, contacting one another, overlapping one another, etc. In some cases, an intrinsic region can be located at least partially between the first and second doped regions. The device can also include a textured region 1108 coupled to the silicon device layer 1102 and positioned to interact with incoming electromagnetic radiation 1110. In this case, the textured region 1108 is located on a side of the silicon device layer 1102 that is opposite to the first doped region 1104 and the second doped region 1106. The textured region 1108 can be associated with an entire surface of the silicon material or only a portion thereof. Further a thermal sensing layer 1112, such as a bolometer or microbolometer, can be coupled to the silicon device layer 1102. In one aspect, a cavity or void is disposed between the thermal sensing layer and the silicon material (not shown). Further details relating to such a device can be found in U.S. Pat. No. 7,847,253, which is incorporated by reference in its entirety. Such a device as shown in FIG. 11 can have the benefits of measuring facial and/or iris features as well as the thermal signature or feature of an individual.

As has been described, the system for identifying an individual can include a light source that is either a passive light source (e.g. sunlight, ambient room lighting) or an active light source (e.g. an LED or lightbulb) that is capable of emitting IR light. The system can utilize any source of light that can be beneficially used to identify an individual. As such, in one aspect the light source is an active light source. Active light sources are well known in the art that are capable of emitting light, particularly in the IR spectrum.

Such active light sources can be continuous or pulsed, where the pulses can be synchronized with light capture at the imaging device. While various light wavelengths can be emitted and utilized to identify an individual, IR light in the range of from about 700 nm to about 1200 nm can be particularly useful. Additionally, in some aspects the active light source can be two or more active light sources each emitting infrared electromagnetic radiation at distinct peak emission wavelengths. While any distinct wavelength emissions within the IR range can be utilized, non-limiting examples include 850 nm, 940 nm, 1064 nm, and the like. In some aspects, the two or more active light sources can interact with the same imager device, either simultaneously or with an offset duty cycle. Such configurations can be useful for independent capture of one or more unique features of the individual for redundant identification. This redundant identification can help insure accurate authorization or identification of the individual. In other aspects, the two or more active light sources can each interact with a different imager device.

In some aspects, the system including the imager device and the light source can be in a fixed position. This may be useful in situations, for example, where the environment facilitates individuals walking directly toward the imager device. In some cases, a fixed position imager device can be associated with a zoom lens to allow zooming along a fixed viewing axis. In other aspects, it can be beneficial to allow movement of the imager device and/or the light source. Thus, a system capable of panning and/or tilting and zooming can track an individual during the identification process. It is noted that for purposes of the present disclosure, panning includes movement of a device in any direction. For example, in one aspect a system can include a pan and zoom module. Such a module allows the system to locate a feature of the individual, such as the iris, zoom in on that feature to optimize the imager device (e.g. camera) and/or light source angle to capture an electronic representation for identification purposes. Such a movement system can be manually or automatically operated.

In one specific aspect, the identification system can include at least two imager devices. The imager devices can be mounted together in a manner that allows dependent or independent movement. In one aspect, the imager devices can be utilized to each capture an identification feature of an individual for redundant identification testing. For example, each imager can capture an independent image using the same or different light sources and compare the identification results. In other aspects, the two or more imagers can function together to capture the electronic representation of the individual. For example, in one aspect, the system can include a first imager device positioned and operable to generate a facial electronic representation of the individual and a second imager device positioned and operable to generate an iris electronic representation of the individual. In such a configuration, the system can also include an image processing circuit that finds the location of the eye from the facial electronic representation and then providing that location to circuit that controls the pan, tilt and zoom functions.

The system can also include an analysis module functionally coupled to the imager device to compare the substantially unique identification trait with a known identification trait to facilitate identification of the individual. For example, the analysis module can obtain known data regarding the identity of an individual from a source such as a database and compare this known data to the electronic representation being captured by the imager device. Various algorithms are known that can analyze the image to define the biometric boundaries/measurements and convert the biometric measurements to a unique code. The unique code can then be stored in the database to be used for comparison to make positive identification of the individual. Such an algorithm has been described for iris detection in U.S. Pat. Nos. 4,641,349 and 5,291,560, which are incorporated by reference in their entirety. It should be noted that the image processing module and the analysis module can be the same or different modules. It is understood that the system described herein can be utilized with any of the identification algorithm.

In another aspect, the system can utilize an automatic pan and zoom module to move at least one of the imager device or the light source and a process module to analyze a facial electronic representation. The process module can provide pan and zoom module coordinates for the face and iris for further zooming, movement, and image capture.

Furthermore, it is noted that in various aspects the present systems can be sized to suit a variety of applications. This is further facilitated by the potential thin film design and the increased sensitivity of the imager devices to IR light and the corresponding decrease in the intensity of IR emission, thus allowing reduction in the size of the light source. In one aspect, for example, the light source, the imager device, and the image processing module collectively have a size of less than about 160 cubic centimeters. In yet another aspect, the light source, the imager device, and the image processing module collectively have a size of less than about 16 cubic centimeters. In yet another aspect, the imager device can have an optical format of about $\frac{1}{7}$ inches.

In another aspect, the system can be activated by a trigger from the individual, whether the individual has knowledge of the trigger or not. The trigger can be a transistor or sensor integrated in the system that is capable of activating the system. Such triggers can be a thermal sensor, motion sensor, photosensor and other like sensors.

The systems according to aspects of the present disclosure can additionally be designed to be concealed from an individual being identified. It should be noted, that other systems that incorporate imager devices having enhanced QE for electromagnetic radiation having wavelengths in the range of about 800 nm to about 1200 nm can also be concealed from an individual by a transparent IR medium as described herein. The increased responsivity or enhanced QE of the present imager devices can allow an IR light signal to be reflected off of an individual and captured behind an optically opaque but IR transparent surface, medium, or material. For example, an imager device can be located behind an IR transparent material such as glass or plastic being at least partially coated with an infrared transparent paint or other IR transparent medium substrate. In some aspects, the IR transparent medium is visually opaque. In one aspect, metal particles can be impregnated into at least a portion of the infrared transparent medium. In yet another aspect, quantum dots may be disposed on a portion of the IR transparent medium such that the IR light is transmitted through the medium while other light is filtered out. The IR transparent material can be any material that allows the transmission of IR light. The IR light source can be directed toward the individual to be identified from either side of the IR transparent material. Reflections of the IR light source are then captured by the imager device for identity processing. It is noted that the concealment of an IR imager in such a manner can be utilized in association with any method or technique using an IR imaging system, and should not be limited to identification of an individual. It is also noted that, in addition to locating the imager behind an IR transparent material, concealment can also be accomplished through the obscured placement of an IR imager having a small footprint. Given the small footprint and the desired electronic devices, the system disclosed herein can consume small amount of power from the electronic device. In one aspect, the system can use less than 5 watts, less than 3 watts and even less than 1 watt of power.

In other aspects, the identification system can be integrated into an electronic device. Non-limiting examples of such devices can include mobile smart phones, cellular phones, laptop computers, desktop computers, tablet computers, ATMs, and the like. In one specific aspect, positive identification of the individual is operable to unlock the electronic device. In this example, the electronic device stores an encrypted authorized user's facial and iris identification trait in a storage registry and an individual's identification traits are captured by an authorization system incorporated into the electronic device. The authorization system can compare the individual's identification trait with the stored authorized user's identification trait for positive identification. This aspect is beneficial for verifying an individual in a financial or legal transaction or any other transaction that requires identification and/or signature. It is contemplated herein, that ATM financial transactions may include a user authorization system where the encrypted authorized user's identification trait is stored on an ATM debit card, such that the ATM device can compare the individual's identification trait with the authorized user trait stored on the card for a positive identification. A similar system can be utilized for credit cards or any other item of commerce.

In another example, a financial transaction may be accomplished via a cell phone device where the authorization system is continuously verifying the authorized user during the duration of the financial transaction via a front side or cameo imaging devices incorporated into the cell phone. Furthermore, in a cell phone embodiment, the imager device can include a switch such that the user can toggle between infrared light capture and visible light capture modes.

Figure 12:
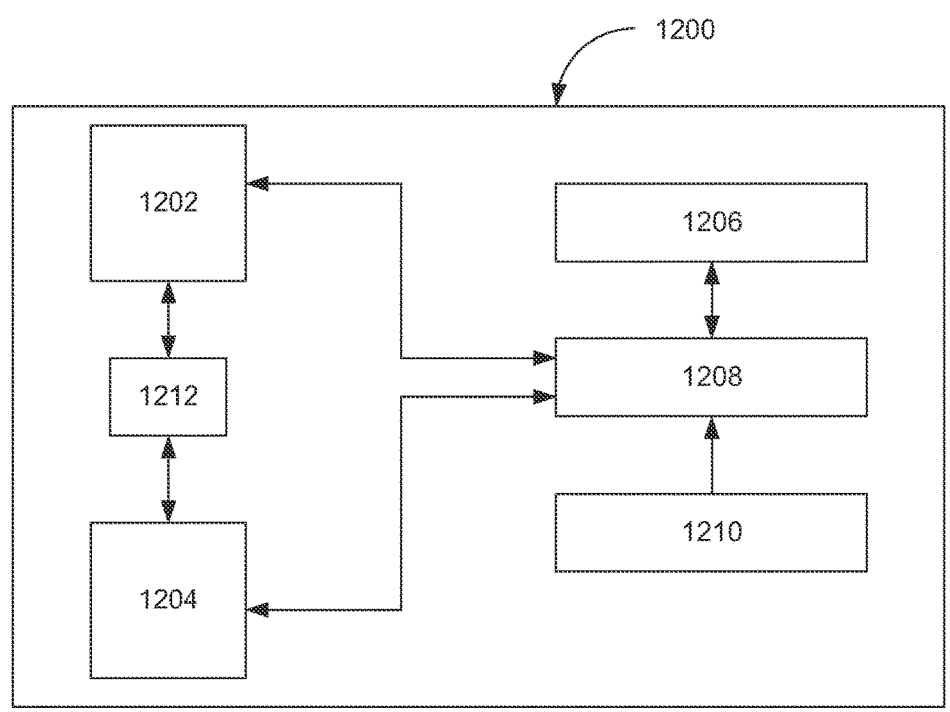
FIG. 12 is a representation of an integrated system for identifying an individual in accordance with one aspect of the present disclosure.

In FIG. 12, an electronic device can include an integrated user authorization system 1200 that can be configured to continuously verify and authorize a user. Such a system can include an imager device 1202 including a semiconductor device layer having a thickness of less than about 10 microns, at least two doped regions forming a junction, and a textured region positioned to interact with the electromagnetic radiation, wherein the imaging device has an external quantum efficiency of at least about 33% for electromagnetic radiation having at least one wavelength of greater than 800 nm, where the imager device is positioned to capture an electronic representation of an identification trait of a user of the device. The imager device at least periodically captures an electronic representation of the user. The system can also include a storage register 1206 operable to store a known identification trait of an authorized user and an analysis module 1208 electrically coupled to the imager device and the storage register, where the analysis module is operable to use algorithms to generated an electronic representation and compare the electronic representation of the identification trait to the known identification trait to verify that the user is the authorized user. Thus an authorized user can continuously use the device while an unauthorized user will be precluded from doing so. In one aspect, the system can include a light source operable to emit electromagnetic radiation having at least one wavelength of from about 700 nm to about 1200 nm toward the user.

In another aspect, a second imager device 1204 can be incorporated into the system. The second imager device can be an IR enhanced imaging device configured to detect electromagnetic radiation having a wavelength in the range of about 800 nm to about 1200 nm. The second imager device can be configured to exclusively track an individual iris, face or both. In another aspect the second imager device can be configured to detect visible light and can be cameo type imager. In another embodiment, a trigger 1210 (e.g. motion sensor) and a switch 1212 can optionally be incorporated in the user authorization system allowing the system to be activated and toggled between a first imager device and a second imager device. Furthermore, a first or second imager device can include a lens or optic element for assisting in the capturing the electronic representation of an individual.

Given the continuous nature of the user authorization system, it can be beneficial to separate the authorization system from the processing system of the electronic device in order to decrease CPU load. One technique for doing so includes monolithically integrating the analysis module and the imager device together on the same semiconductor device layer and separate from the CPU of the electronic device. In this way the authorization system functions independently from the CPU of the electronic device.

Furthermore, in some aspects the authorization system can include a toggle to switch the imager device between IR light capture and visible light capture. As such, the imager can switch between authorizing the user and capturing visible light images.

Furthermore, it can be beneficial to encrypt the known identification trait for security reasons. Such encryption can protect an authorized user from identity theft or unauthorized use of an electronic device.

Figure 13:
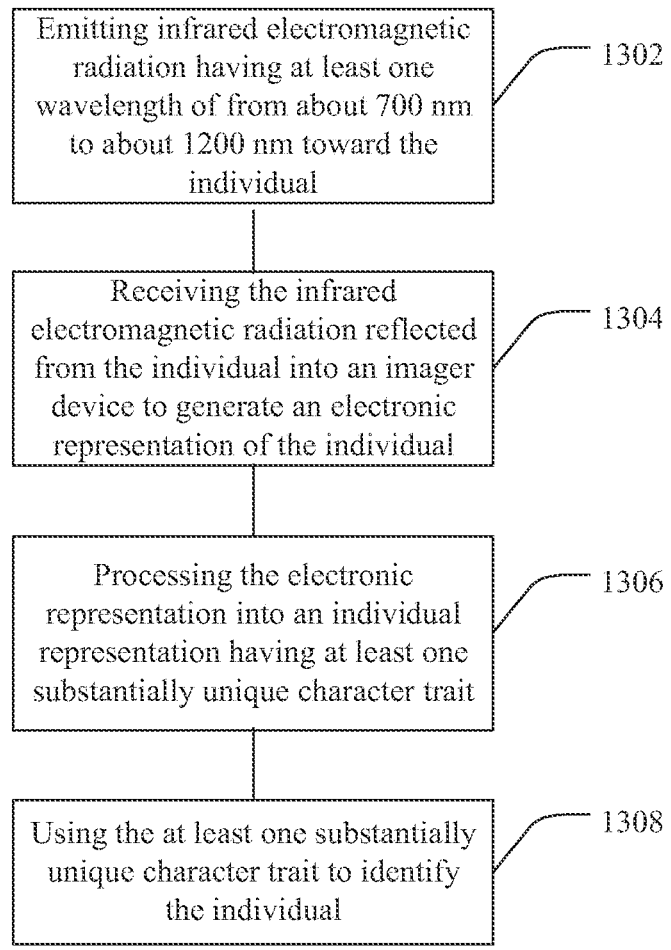
FIG. 13 is a flow diagram of a method in accordance with another aspect of the present disclosure.

In another aspect of the present disclosure, a method of identifying an individual is provided. As is shown in FIG. 13, such a method can include emitting infrared electromagnetic radiation having at least one wavelength of from about 700 nm to about 1200 nm toward the individual 1302, receiving the infrared electromagnetic radiation reflected from the individual into an imager device to generate an electronic representation of the individual 1304, processing the electronic representation into an individual representation having at least one substantially unique identification trait 1306, and using the at least one substantially unique identification trait to identify the individual 1308. The imager device includes a semiconductor device layer, at least two doped regions forming a junction, and a textured region positioned to interact with the electromagnetic radiation, wherein the imaging device has an external quantum efficiency of at least about 30% for electromagnetic radiation having at least one wavelength of greater than 800 nm.

A variety of identification traits can be utilized to identify an individual, and any identification trait capable of being utilized for such identification is considered to be within the present scope. Non-limiting examples of such identification traits include facial features, iris patterns, body posture, gait, thermal images, and the like. In one specific aspect, the substantially unique identification trait can include an electronic representation of an iris sufficient to identify the individual. As has been described, the enhanced responsivity of the present system can facilitate the capture of an electronic representation of the iris across a wide range of distances. In one aspect, for example, the electronic representation of the iris can be captured by the imager device at a distance of from about 0.5 m to about 15 m from the individual. In another aspect, the electronic representation of the iris can be captured by the imager device at a distance of from about 2 m to about 10 m from the individual. In a further aspect, the electronic representation of the iris can be captured at a distance of greater than 2 m from the imager device to the individual using the infrared electromagnetic radiation at an intensity that is below 10,000 mW/mm2/ steradians.

Of course, it is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for identifying an individual, comprising:
    an active light source capable of emitting electromagnetic radiation having at least one wavelength of from about 800 nanometers (nm) to about 1200 nm;
    an imager device positioned to receive the electromagnetic radiation upon reflection from an individual to generate an electronic representation of the individual, the imager device comprising:
        at least one infrared light detecting pixel having a silicon semiconductor device layer exhibiting a thickness of less than about 10 microns, the semiconductor device layer comprising at least two doped regions forming a junction and a textured region having a topology comprising a plurality of nanostructures or microstructures formed by one of lasing and chemical etching, the textured region being positioned to interact with the electromagnetic radiation so as to increase the path length within the semiconductor device layer, wherein the imager device has a quantum efficiency of at least about 33% for electromagnetic radiation having at least one wavelength of greater than 800 nm and a responsivity in a range from about 0.1 Amps/Watt (A/W) to about 0.55 A/W for at least one wavelength in a range from about 1000 nm to about 1200 nm, wherein the at least one infrared light detecting pixel further comprises a thermal sensing layer disposed on a side of the semiconductor device layer opposite the incoming electromagnetic radiation for capturing thermal images of the individual; and
        at least one visible light detecting pixel configured to detect at least one wavelength in the range of from about 350 nm to about 800 nm for capturing visible light images of the individual; and
    an image processing module functionally coupled to the imager device and operable to receive the electronic representation, wherein the image processing module is operable to process the electronic representation into an individual representation having at least one substantially unique identification trait.

2. The system of claim 1, wherein the semiconductor device layer is coupled to a bulk semiconductor.

3. The system of claim 1, wherein the active light source is two or more active light sources each emitting infrared electromagnetic radiation at distinct peak emission wavelengths.

4. The system of claim 3, wherein the two or more active light sources emit infrared electromagnetic radiation at about 850 nm and about 940 nm.

5. The system of claim 1, wherein the imager device is capable of capturing the electronic representation with sufficient detail to identify the at least one substantially unique identification trait using electromagnetic radiation emitted from the active light source having at least one wavelength of from about 800 nm to about 1200 nm and having a scene radiance impinging on the individual at 3 meters that is at least 0.1 milliWatts/millimeter squared (mW/mm$^2$).

6. The system of claim 1, wherein the imager device is silicon-based and has a response time of from about 0.1 millisecond (ms) to about 1 ms and a quantum efficiency of at least about 33% for electromagnetic radiation having at least one wavelength of greater than 800 nm.

7. The system of claim 1, wherein the imager device is silicon-based and has a response time of from about 0.1 millisecond (ms) to about 1 ms and a quantum efficiency of at least about 11% for electromagnetic radiation having at least one wavelength of greater than 940 nm.

8. The system of claim 1, further comprising an analysis module functionally coupled to the image processing module, wherein the analysis module is operable to compare the at least one substantially unique identification trait with a known identification trait to facilitate identification of the individual.

9. The system of claim 1, further comprising an automatic pan and zoom module operable to move at least one of the light source or the imager device in order to track the individual.

10. The system of claim 1, wherein the imager device includes at least two imager devices.

11. The system of claim 10, wherein the at least two imager devices includes a first imager device positioned and operable to generate a facial electronic representation of the individual and a second imager device positioned and operable to generate an iris electronic representation of the individual.

12. The system of claim 11, further comprising:
    an automatic pan and zoom module operable to move at least one of the active light source or the imager device; and
    a process module to analyze the facial electronic representation and provide the pan and zoom module coordinates for the face and iris.

13. The system of claim 12, wherein the system is concealed behind an infrared transparent and optically opaque medium from the individual.

14. The system of claim 1, wherein the light source, the imager device, and the image processing module collectively has a size of less than about 160 cubic centimeters.

15. The system of claim 1, further comprising an electronic device into which the system is integrated, wherein the electronic device includes at least one of a mobile smart phone, a cellular phone, a laptop computer, and a tablet computer.

16. The system of claim 15, wherein positive identification of the individual is operable to verify the individual in a financial transaction.

17. A method of identifying an individual, comprising:
emitting infrared electromagnetic radiation having at least one wavelength of from about 800 nanometers (nm) to about 1200 nm toward the individual;
receiving the infrared electromagnetic radiation reflected from the individual into an imager device to generate an electronic representation of the individual, the imager device comprising:
   at least one infrared light detecting pixel having a silicon semiconductor device layer exhibiting a thickness of less than about 10 microns, the semiconductor device layer comprising at least two doped regions forming a junction and a textured region having a topology comprising a plurality of nanostructures or microstructures formed by one of lasing and chemical etching, the textured region being positioned to interact with the electromagnetic radiation so as to increase the path length within the semiconductor device layer, wherein the imager device has a quantum efficiency of at least about 33% for electromagnetic radiation having at least one wavelength of greater than 800 nm and a responsivity in a range from about 0.1 Amps/Watt (A/W) to about 0.55 A/W for at least one wavelength in a range from about 1000 nm to about 1200 nm, wherein the at least one infrared light detecting pixel further comprises a thermal sensing layer disposed on a side of the semiconductor device layer opposite the incoming electromagnetic radiation for capturing thermal images of the individual; and
   at least one visible light detecting pixel configured to detect at least one wavelength in the range of from about 350 nm to about 800 nm for capturing visible light images of the individual;
processing the electronic representation into an individual representation having at least one substantially unique identification trait; and
using the at least one substantially unique identification trait to identify the individual.

18. The method of claim 17, wherein the at least one substantially unique identification trait includes an electronic representation of an iris sufficient to identify the individual.

19. The method of claim 18, wherein the electronic representation of the iris is captured by the imager device at a distance of from about 0.5 meter (m) to about 15 m from the individual.

20. The method of claim 17, wherein emitting infrared electromagnetic radiation further includes emitting infrared electromagnetic radiation from at least two active light sources each emitting at distinct peak emission wavelengths.

21. The method of claim 20, wherein electronic representations from each active light source are processed into individual representations each having at least one substantially unique identification trait, and wherein each individual representation is compared to verify identification results of the individual.

22. The method of claim 17, further comprising moving the emitted infrared electromagnetic radiation and the imager device relative to movements of the individual in order to track the individual during receiving of the infrared electromagnetic radiation.

23. The system of claim 1, wherein the imager device has a quantum efficiency of at least about 46% for electromagnetic radiation having at least one wavelength of greater than 800 nm.

24. The method of claim 17, wherein the imager device has a quantum efficiency of at least about 46% for electromagnetic radiation having at least one wavelength of greater than 800 nm.

* * * * *